United States Patent
Otake

(10) Patent No.: US 10,270,605 B2
(45) Date of Patent: Apr. 23, 2019

(54) CONTROL APPARATUS, COMMUNICATION SYSTEM, COMMUNICATION NODE CONTROL METHOD, AND PROGRAM

(71) Applicant: NEC Corporation, Tokyo (JP)

(72) Inventor: Takahiro Otake, Tokyo (JP)

(73) Assignee: NEC CORPORATION, Tokyo (JP)

( * ) Notice: Subject to any disclaimer, the term of this patent is extended or adjusted under 35 U.S.C. 154(b) by 60 days.

(21) Appl. No.: 14/779,555

(22) PCT Filed: Mar. 28, 2014

(86) PCT No.: PCT/JP2014/059092
§ 371 (c)(1),
(2) Date: Sep. 23, 2015

(87) PCT Pub. No.: WO2014/157609
PCT Pub. Date: Oct. 2, 2014

(65) Prior Publication Data
US 2016/0050081 A1    Feb. 18, 2016

(30) Foreign Application Priority Data
Mar. 29, 2013    (JP) .................................. 2013-072753

(51) Int. Cl.
*H04L 12/18* (2006.01)
*H04L 12/64* (2006.01)
(Continued)

(52) U.S. Cl.
CPC ...... *H04L 12/1868* (2013.01); *H04L 12/1886* (2013.01); *H04L 12/6418* (2013.01);
(Continued)

(58) Field of Classification Search
CPC combination set(s) only.
See application file for complete search history.

(56) References Cited

U.S. PATENT DOCUMENTS

2003/0225908 A1* 12/2003 Srinivasan ............ H04L 12/462
709/243
2009/0067330 A1* 3/2009 Shand ..................... H04L 45/04
370/235
(Continued)

FOREIGN PATENT DOCUMENTS

CN    103346969 A    10/2013
JP    2011-29888 A    2/2011
(Continued)

OTHER PUBLICATIONS

Extended European Search Report dated Oct. 28, 2016.
(Continued)

*Primary Examiner* — Kouroush Mohebbi
(74) *Attorney, Agent, or Firm* — McGinn I.P. Law Group, PLLC.

(57) ABSTRACT

A control apparatus includes a representative port selection unit configured to select, for each of a plurality of domains formed by a plurality of communication nodes disposed on a network to be controlled, a representative port configured to transfer a broadcast packet with an adjacent one of the domains, a broadcast path calculation unit configured to calculate a forwarding path for the broadcast packet that passes through the representative port, for each of the domains, a control information generation unit configured to generate, for each communication node on the forwarding path, control information for causing the broadcast packet to be forwarded along the forwarding path, and a control information setting unit configured to set the generated control information in each communication node on the forwarding path.

21 Claims, 16 Drawing Sheets

(51) Int. Cl.
*H04L 12/24* (2006.01)
*H04L 12/707* (2013.01)
*H04L 12/761* (2013.01)
*H04L 12/715* (2013.01)
*H04L 12/703* (2013.01)

(52) U.S. Cl.
CPC .......... *H04L 41/0668* (2013.01); *H04L 45/22* (2013.01); *H04L 45/04* (2013.01); *H04L 45/16* (2013.01); *H04L 45/28* (2013.01); *H04L 45/46* (2013.01)

(56) References Cited

U.S. PATENT DOCUMENTS

2013/0034104 A1* 2/2013 Yedavalli ............... H04L 41/12
370/400
2013/0308462 A1 11/2013 Ashida et al.

FOREIGN PATENT DOCUMENTS

| JP | 2011-101245 A | 5/2011 |
| JP | 2012-175394 A | 9/2012 |
| JP | 2013-26687 A | 2/2013 |
| WO | WO 2012/108382 A1 | 8/2012 |
| WO | WO 2013/022082 A1 | 2/2013 |

OTHER PUBLICATIONS

International Search Report (ISR) (PCT Form PCT/ISA/210), in PCT/JP2014/059092, dated Apr. 28, 2014.
Nick McKeown and seven other authors, "OpenFlow: Enabling Innovation in Campus Networks," [online], [Searched on Feb. 18, Heisei 25 (2013)], Internet <URL: http://www.openflow.org/documents/openflow-wp-latest.pdf>.
"OpenFlow Switch Specification" Version 1.3.1 (Wire Protocol 0x04), [on line], [Searched on Feb. 8, Heisei 25 (2013)], Internet <URL: https://www.opennetworking.org/images/stories/downloads/specification/openflow-spec-v1.3.1.pdf>.
Japanese Office Action dated Jun. 28, 2016 with a partial English translation thereof.
Yoshida, K. "A Study of Forming Flexible Groups and Efficient Geocasting Using SDN and Locational Information." Mar. 25, 2013, URL, http://hdl.handle.net/2216/54228 (with English Abstract).

* cited by examiner

CONTROL APPARATUS, COMMUNICATION SYSTEM, COMMUNICATION NODE CONTROL METHOD, AND PROGRAM

REFERENCE TO RELATED APPLICATION

This application is based upon and claims the benefit of the priority of Japanese Patent Application No. 2013-072753 filed on Mar. 29, 2013, the disclosure of which is incorporated herein in its entirety by reference thereto.

TECHNICAL FIELD

The present invention relates to a control apparatus, a communication system, a communication node control method, and a program. More specifically, the invention relates to a control apparatus configured to perform centralized control of a communication node, a communication system, a communication node control method, and a program.

BACKGROUND

Non Patent Literature 1 proposes a technology referred to as OpenFlow using a switch configured to forward a packet and a control apparatus configured to control a communication path by controlling forwarding of the packet by this switch. Non Patent Literature 2 describes specifications required for an OpenFlow switch.

Patent Literature 1 discloses a method of reducing a load on a path control apparatus corresponding to an OpenFlow controller by differentiating the time-out value for the flow entry for each segment of a packet communication path.

PATENT LITERATURE (PTL)

[PTL 1]
JP Patent Kokai Publication No. JP2011-101245A

NON PATENT LITERATURE (NPL)

[NPL 1]
Nick McKeown and seven other authors, "OpenFlow: Enabling Innovation in Campus Networks," [online], [Searched on February 18, Heisei 25 (2013)], Internet <URL: http://www.openflow.org/documents/openflow-wp-latest.pdf>.
[NPL 2]
"OpenFlow Switch Specification" Version 1.3.1 (Wire Protocol 0x04), [on line], [Searched on February 18, Heisei 25 (2013)], Internet <URL: https://www.opennetworking.org/images/stories/downloads/specification/openflow-spec-v1.3.1.pdf>-.

SUMMARY

The following analysis has been given by the present invention. In order to perform broadcasting in a network of a centralized control type such as the one disclosed in each of Non Patent Literatures 1 and 2 and Patent Literature 1, it is necessary to calculate a path (broadcasting path) from one terminal to all the other terminals and to give an instruction to forward a target packet (broadcast packet) to each communication node on that path.

When a failure occurs in a link on the forwarding path for the broadcasting packet, it is necessary to review not only the communication nodes on both ends of the link but also an entirety of the forwarding path and transmit a forwarding instruction to each communication node on a new forwarding path. The longer the path due to an increase in the size of the network, and the larger the number of communication nodes (external apparatuses) of broadcasting destinations, the more communication nodes that need resetting of the forwarding instruction. As a result, there is a problem that a load on the control apparatus increases.

An object of the present invention is to provide a control apparatus, a communication system, a communication node control method, and a program capable of contributing to reduction of a load on the control apparatus for broadcasting in a network of a centralized control type.

Solution to Problem

According to a first aspect, there is provided a control apparatus comprising:
a representative port selection unit configured to select, for each of a plurality of domains formed by a plurality of communication nodes disposed on a network to be controlled, a representative port configured to transfer a broadcast packet with an adjacent one of the domains;
a broadcast path calculation unit configured to calculate a forwarding path for the broadcast packet that passes through the representative port, for each of the domains;
a control information generation unit configured to generate, for each communication node on the forwarding path, control information for causing the broadcast packet to be forwarded along the forwarding path; and
a control information setting unit configured to set the generated control information in each communication node on the forwarding path.

According to a second aspect, there is provided a communication system comprising:
a control apparatus including:
a representative port selection unit configured to select, for each of a plurality of domains formed by a plurality of communication nodes disposed on a network to be controlled, a representative port configured to transfer a broadcast packet with an adjacent one of the domains;
a broadcast path calculation unit configured to calculate a forwarding path for the broadcast packet that passes through the representative port, for each of the domains;
a control information generation unit configured to generate, for each communication node on the forwarding path, control information for causing the broadcast packet to be forwarded along the forwarding path; and
a control information setting unit configured to set the generated control information in each communication node on the forwarding path; and
the communication nodes each configured to process the packet according to the control information set by the control apparatus.

According to a third aspect, there is provided a communication node control method by a control apparatus, the communication node control method comprising:
selecting, for each of a plurality of domains formed by a plurality of communication nodes disposed on a network to be controlled, a representative port configured to transfer a broadcast packet with an adjacent one of the domains;
calculating a forwarding path for the broadcast packet that passes through the representative port, for each of the domains;
generating, for each communication node on the forwarding path, control information for causing the broadcast packet to be forwarded along the forwarding path; and setting the generated control information in each communication node on the forwarding path. This method is linked to a specific machine that is the control apparatus configured to control the communication nodes.

According to a fourth aspect, there is provided a program configured to cause a computer to execute processings of:

selecting, for each of a plurality of domains formed by a plurality of communication nodes disposed on a network to be controlled, a representative port configured to transfer a broadcast packet with an adjacent one of the domains;

calculating a forwarding path for the broadcast packet that passes through the representative port, for each of the domains;

generating, for each communication node on the forwarding path, control information for causing the broadcast packet to be forwarded along the forwarding path; and setting the generated control information in each communication node on the forwarding path. This program can be stored in a computer-readable (non-transient) storage medium. That is, the present invention can be embodied as a computer program product.

The meritorious effects of the present invention are summarized as follows.

The present invention can contribute to reduction of a load on the control apparatus for broadcasting on the network of a centralized control type. That means that the present invention transforms the prior art structure into the control apparatus which can perform broadcasting without increasing its load.

PREFERRED MODES

Figure 1:
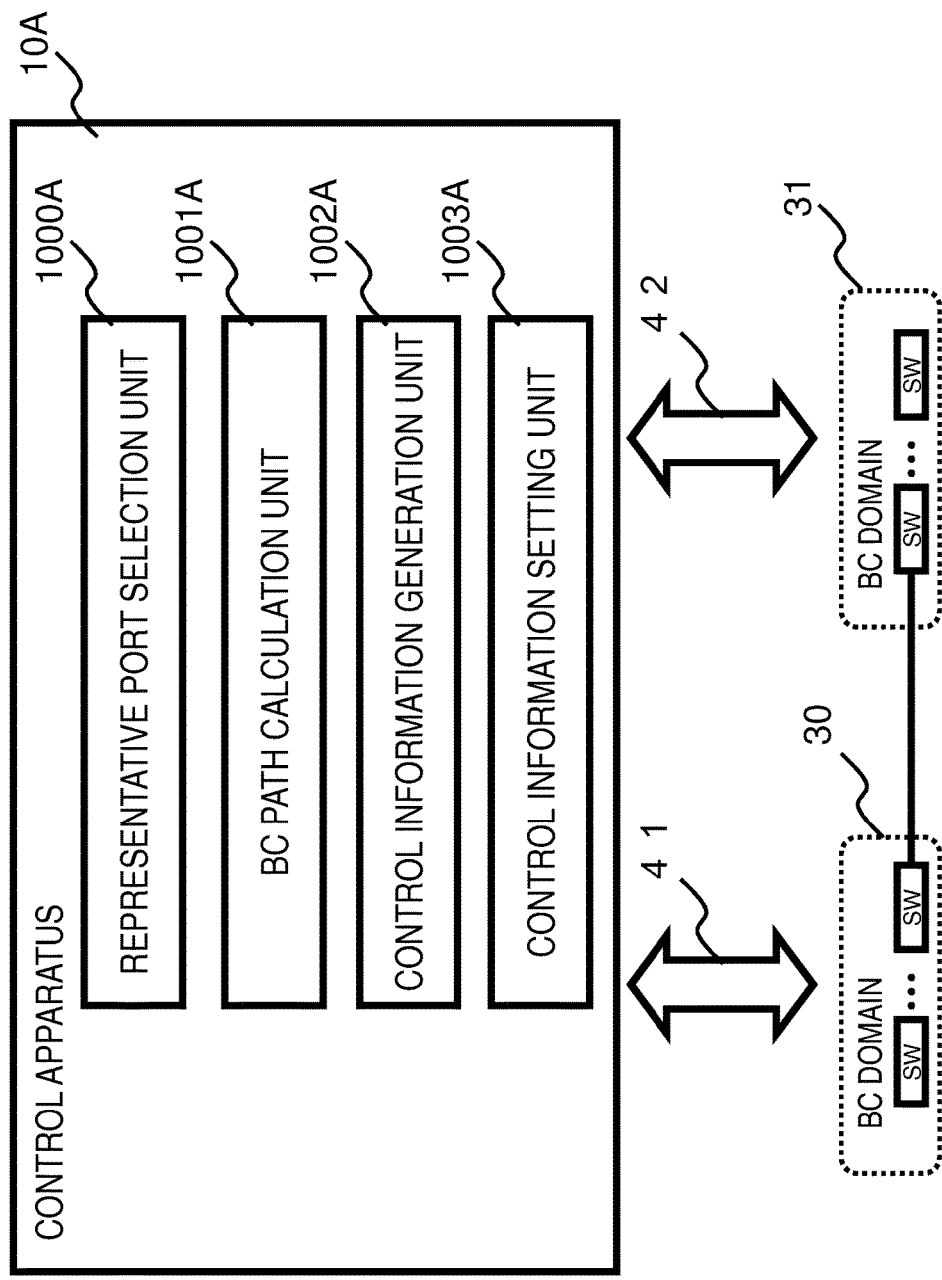
FIG. 1 is a diagram illustrating a configuration of an exemplary embodiment of the present.

First, an overview of an exemplary embodiment of the present disclosure will be described with reference to the drawing. A reference sign in the drawing appended to this overview is given to each element for convenience, as an example for helping understanding, and does not intend to limit the present disclosure to the mode that has been illustrated.

As illustrated in FIG. 1, the exemplary embodiment of the present disclosure can be implemented by a communication system including a control apparatus 10A connected to communication nodes (SWs in FIG. 1) through control channels 41 and 42 and the communication nodes (SWs in FIG. 1) each configured to process a packet according to control information set by the control apparatus 10A.

More specifically, the control apparatus 10A includes a representative port selection unit 1000A, a broadcast path calculation unit 1001A, a control information generation unit 1002A, and a control information setting unit 1003A. The representative port selection unit 1000A selects a representative port configured to transfer a broadcast packet with an adjacent domain for each of domains 30 and 31 formed by a plurality of the communication nodes disposed on a network to be controlled. The broadcast path calculation unit 1001A calculates a forwarding path for the broadcast packet that passes through the representative port for each of the domains. The control information setting unit 1002A generates, for each communication node on the forwarding path, the control information for transferring the broadcast packet along the forwarding path. The control information setting unit 1003A sets the generated control information in each communication node on the forwarding path.

Assume that a failure occurs in a link of the domain 30, which is one of the domains, for example. Then, by adopting the above configuration, the need for recalculating a forwarding path for a broadcast packet in the domain 31 adjacent to the domain 30 and resetting the control information is eliminated. That is, the control apparatus 10A just needs to recalculate a forwarding path for the broadcast packet and to reset the control information in the domain 30. Thus, a load on the control apparatus 10A is reduced.

First Exemplary Embodiment

Figure 2:
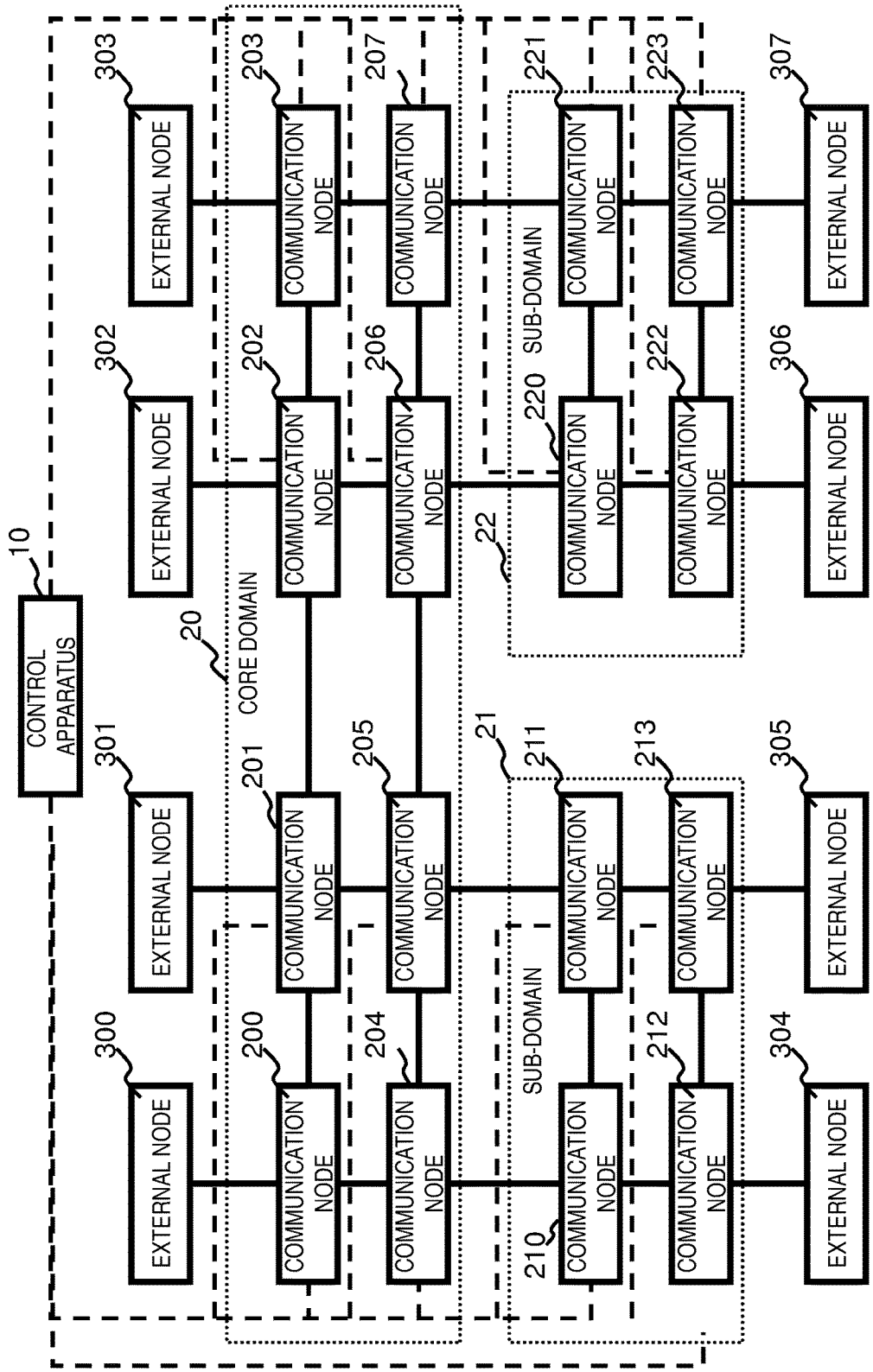
FIG. 2 is a diagram illustrating a configuration of a communication system in a first exemplary embodiment of the present disclosure.

Next, a detailed description will be given about a first exemplary embodiment of the present disclosure, with reference to the drawings. FIG. 2 is a diagram illustrating a configuration of a communication system in the first exemplary embodiment of the present disclosure. Referring to FIG. 2, the configuration connecting communication nodes 200 to 207, 210 to 213, and 220 to 223, external nodes 300 to 307, and a control apparatus 10 is illustrated. The communication nodes 200 to 207, 210 to 213, and 220 to 223 are each configured to process a received packet based on control information set by the control apparatus 10. The external nodes 300 to 307 are each configured to perform communication through corresponding one or more of the communication nodes 200 to 207, 210 to 213, and 220 to 223. The control apparatus 10 is configured to control the communication nodes 200 to 207, 210 to 213, and 220 to 223.

In the example in FIG. 2, a total of 16 communication nodes 200 to 207, 210 to 213, and 220 to 223 are disposed at three locations, and belong to domains (refer to dotted lines in FIG. 2) that are logically formed for the respective locations. In the example in FIG. 2, the communication nodes 200 to 207 belong to a core domain (high-order domain) 20, the communication nodes 210 to 213 belong to a sub-domain (low-order domain) 21, and the communication nodes 220 to 223 belong to a sub-domain 22.

The communication nodes 200 to 207, 210 to 213, and 220 to 223 are connected to the control apparatus 10 through control channels indicated by dotted lines. Solid lines between the communication nodes 200 to 207, 210 to 213, and 220 to 223 and the external nodes 300 to 307 indicate data transfer channels.

Each of the external nodes 300 to 307 is connected to the nearest communication node through a data transfer channel. In the example in FIG. 2, the external node 300 is connected to the communication node 200, and the external node 301 is connected to the communication node 201. The external node 302 is connected to the communication node 202, the external node 303 is connected to the communication node 203, the external node 304 is connected to the communication node 212, the external node 305 is connected to the communication node 213, the external node 306 is connected to the communication node 222, and the external node 307 is connected to the communication node 223.

The communication node 200 is connected to the communication node 201, the communication node 204, and the external node 300 through the data transfer channels.

The communication node 201 is connected to the communication node 200, the communication node 202, the communication node 205, and the external node 301 through the data transfer channels.

The communication node 202 is connected to the communication node 201, the communication node 203, the communication node 206, and the external node 302 through the data transfer channels.

The communication node 203 is connected to the communication node 202, the communication node 207, and the external node 303 through the data transfer channels.

The communication node 204 is connected to the communication node 200, the communication node 205, and the communication node 210 through the data transfer channels.

The communication node 205 is connected to the communication node 201, the communication node 204, the communication node 206, and the communication node 211 through the data transfer channels.

The communication node 206 is connected to the communication node 202, the communication node 205, the communication node 207, and the communication node 220 through the data transfer channels.

The communication node 207 is connected to the communication node 203, the communication node 206, and the communication node 221 through the data transfer channels.

The communication node 210 is connected to the communication node 204, and the communication node 211, and the communication node 212 through the data transfer channels.

The communication node 211 is connected to the communication node 205, the communication node 210, and the communication node 213 through the data transfer channels.

The communication node 212 is connected to the communication node 210, the communication node 213, and the external node 304 through the data transfer channels.

The communication node 213 is connected to the communication node 211, the communication node 212, and the external node 305 through the data transfer channels.

The communication node 220 is connected to the communication node 206, the communication node 221, and the communication node 222 through the data transfer channels.

The communication node 221 is connected to the communication node 207, the communication node 220, and the communication node 223 through the data transfer channels.

The communication node 222 is connected to the communication node 220, the communication node 223, and the external node 306 through the data transfer channels.

The communication node 223 is connected to the communication node 221, the communication node 222, and the external node 307 through the data transfer channels.

An OpenFlow switch in Non Patent Literatures 1 and 2 can be pointed out, as each of the communication nodes 200 to 207, 210 to 213, and 220 to 223. An apparatus may also be considered which, using a CLI (command line interface) through a Telnet, specifies an arbitrary packet matching condition, thereby allowing setting of a packet forwarding destination.

Figure 3:
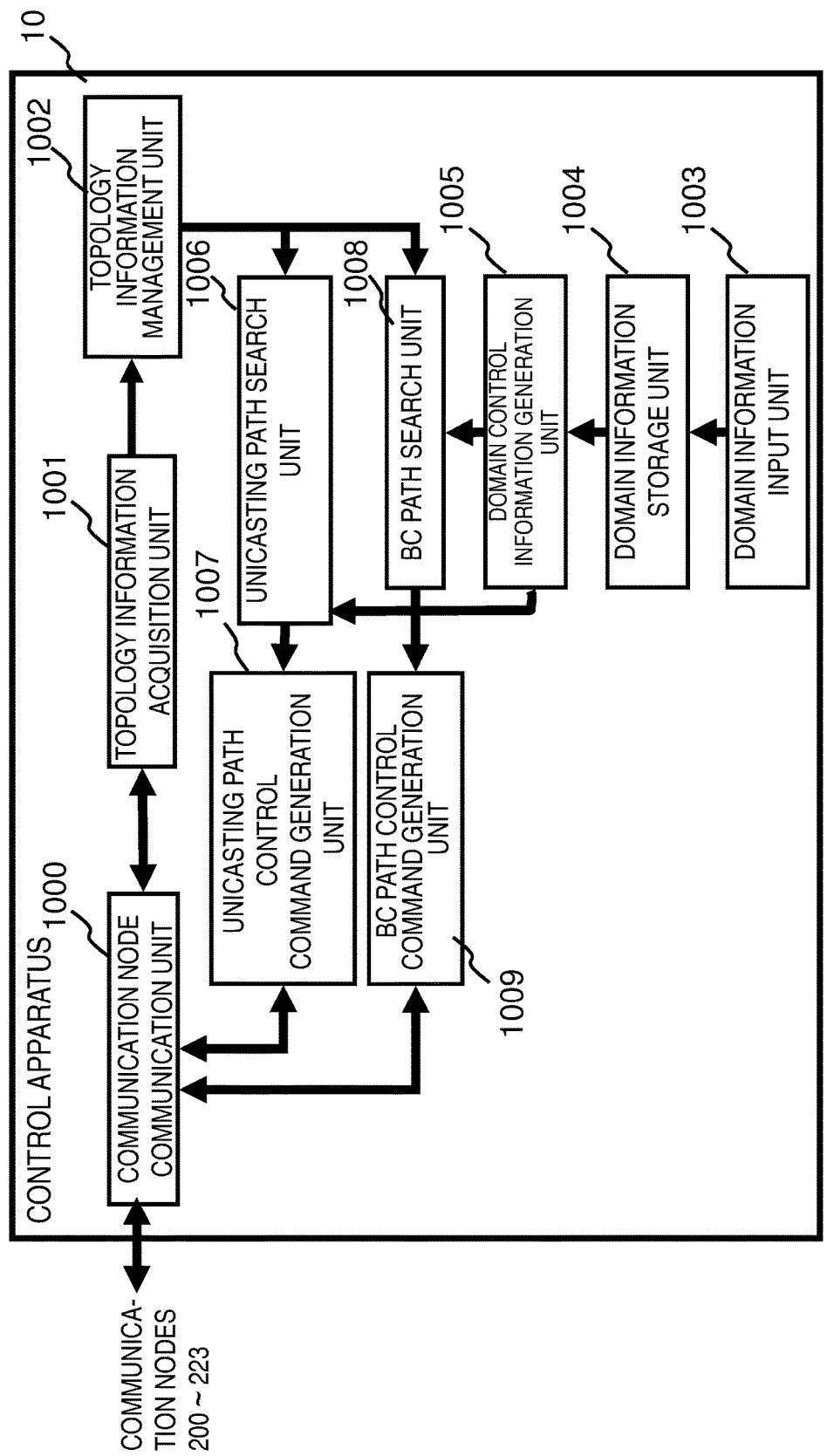
FIG. 3 is a block diagram illustrating a configuration of a control apparatus in the first exemplary embodiment of the present disclosure.

FIG. 3 is a block diagram illustrating a detailed configuration of the control apparatus 10 in the first exemplary embodiment of the present disclosure. Referring to FIG. 3, the control apparatus 10 includes a communication node communication unit 1000, a topology information acquisition unit 1001, a topology information management unit 1002, a domain information input unit 1003, a domain information storage unit 1004, a domain control information generation unit 1005, a unicasting path search unit 1006, a unicasting path control command generation unit 1007, a BC path search unit 1008, and a BC path control command generation unit 1009. The communication node communication unit 1000 is configured to perform control communication with each communication node. The topology information acquisition unit 1001 is configured to acquire information on a topology among the communication nodes 200 to 207, 210 to 213, and 220 to 223 through the communication node communication unit 1000. The topology information management unit 1002 is configured to store the topology information. The domain information input unit 1003 is configured to receive an input of domain configuration information. The domain information storage unit 1004 is configured to store the domain configuration information received by the domain information input unit 1003. The domain control information generation unit 1005 is configured to select an inter-domain GW port (inter-domain gateway port) as domain control information. The unicasting path search unit 1006 is configured to search a unicasting path. The unicasting path control command generation unit 1007 is configured to generate control information to be set in each of the communication nodes 200 to 207, 210 to 213, and 220 to 223 based on the path searched by the unicasting path search unit 1006 and transmit a control information setting command through the communication node communication unit 1000. The BC path search unit 1008 is configured to search a broadcasting (hereinafter referred to as "BC") path. The BC path control command generation unit 1009 is configured to generate control information to be set in each of the communication nodes 200 to 207, 210 to 213, and 220 to 223 based on the path searched by the BC path search unit 1008 and transmit a control information setting command through the communication node communication unit 1000.

The communication node communication unit 1000 establishes a control session with each of the communication nodes 200 to 207, 210 to 213, and 220 to 223 and transmits and receives a control command. As the control command, an OpenFlow protocol control message in Non Patent Literature 2 may be employed. Alternatively, communication may be performed using the CLI through the Telnet or an SNMP (Simple Network Management Protocol).

The topology information acquisition unit 1001 acquires the topology among the communication nodes. For acquisition of the topology, there is provided a method of accepting identification information on the communication node adjacent to each communication node. As an identification protocol among switches, an LLDP (Link Layer Discovery Protocol) is typical. It may also be so arranged that the control apparatus 10 executes control such that a packet including an ID and a port number of a specific one of the communication nodes is output from a specific port of the specific communication node, and then the packet may be received at the communication node opposed to the specific communication node, thereby performing identification between the communication nodes. A Packet-out message and a Packet-In message in accordance with an OpenFlow protocol in Non Patent Literature 2 can be used for packet output from the control apparatus and packet receipt at the control apparatus. A method of setting the topology information in advance by a network manager can also be considered.

The topology information management unit 1002 stores the topology information acquired by the topology information acquisition unit 1001.

The domain information input unit 1003 receives an input of the information on the domain to which each communication node belongs using a CUI (character user interface), a GUI (graphical user interface), or the like. As an input style of the domain configuration information, a method of directly receiving the domain to which each communication node belongs can be adopted. A method can also be adopted where an input of a condition for dynamically determining the domain to which each communication node belongs is received and the domain information input unit 1003 determines whether or not the communication node belongs to the domain.

The domain information storage unit 1004 stores the domain configuration information received by the domain information input unit 1003. A plurality of the domain configuration information can be stored.

The domain control information generation unit 1005 performs processing of selecting the inter-domain GW port (inter-domain gateway port) that serves as a representative port between the domains, based on the domain information stored in the domain information storage unit 1004 and the topology information stored in a topology table.

More specifically, the domain control information generation unit 1005 extracts all ports connecting the core domain and each of the sub-domains from the topology information stored in the topology information management unit 1002, and selects one of the ports that have been linked up, as the inter-domain GW port. Then, the domain control information generation unit 1005 permits transmission of a broadcast packet through the inter-domain GW port, and does not permit transmission of the broadcast packet through a port connecting the domains other than the inter-domain GW port. With this arrangement, output of a plurality of the broadcast packets to the ports connecting the domains can be prevented. The domain control information generation unit 1005 notifies the selected inter-domain GW port to the BC path search unit 1008. As a timing of selecting the inter-domain GW port, a case where the domain configuration information has been supplied to the domain information input unit 1003, or a case where a failure has occurred in the inter-domain GW port and a change in the physical topology of the inter-domain GW port has been notified from the topology information management unit 1002 can be pointed out. To take an example, at a moment when each sub-domain has been divided into a plurality of divided sub-domains, the domain control information generation unit 1005 selects an inter-domain GW port for each of the divided sub-domains. With this arrangement, as long as the divided sub-domain is connected to the core domain, communication can be continued.

The unicasting path search unit 1006 calculates a unicast path between the communication nodes connected to the external nodes. When the unicast path is calculated, the unicasting path search unit 1006 may calculate the path that is different for each of the communication nodes connected to the external nodes, or a path tree starting from or terminating at the communication node connected to the external node. As a method of calculating the path, use of a shortest path tree (represented by Dijkstra's algorithm) can be pointed out. Each of these paths is not limited to a single one, and the path that is different for each unit of communication may be employed. When the calculation is performed, the calculation using every communication node as a starting point or a terminating point may be performed. The unicast path may be calculated to be optimal for an entirety of a path network among the communication nodes, or an optimal path may be calculated for each domain, and the inter-domain GW port may be selected for a path between the domains.

The unicasting path control command generation unit 1007 generates an instruction regarding the path between the communication nodes connected to the external nodes. The unicasting path control command generation unit 1007 specifies at least a transmission destination address for each communication node on the path as a matching condition for identifying a target packet. As the transmission destination address, an IP (Internet Protocol) address, a MAC (Media Access Control) address, or a TCP/UDP (Transmission Control Protocol/User Datagram Protocol) port can be pointed out.

The BC path search unit 1008 calculates, for each domain, a spanning tree (spanning tree) path whereby distribution can be performed from the communication node connected to the external node to all the other communication nodes connected at least to the external node and the communication node including the inter-domain GW port within the same domain. One or a plurality of the spanning tree paths may be calculated, for each domain. When the plurality of the spanning tree paths are used, the spanning tree path that is different for each communication node connected to the external node may be calculated. As a method of calculating the path, a method using a minimum spanning tree (represented by Prim's algorithm or Kruskal's algorithm) can be pointed out. When this calculation is performed, a certain one of the communication nodes not connected to the external node and being the end of the path may be excluded, and this excluding operation may be repeated to exclude the communication node that is not present between the communication nodes connected to the external nodes.

The spanning tree path calculated for each domain is connected to the core domain and each sub-domain, using the inter-domain GW port. This can generate one spanning tree path for the entirety of the network.

The BC path control command generation unit 1009 includes a broadcasting path control function and a broadcasting matching condition generation function. The broadcasting path control function is a function of generating an instruction for broadcasting forwarding according to the broadcasting path calculated by the BC path search unit 1008. The instruction regarding the broadcasting path is set with priority lower than that of the instruction regarding the unicasting path. With this arrangement, a packet targeted for unicasting can be forwarded using the unicasting path, and a packet for a purpose other than the unicasting can be targeted for broadcasting. The broadcasting matching condition generation function generates a matching condition that permits forwarding of a broadcast packet transmitted from the external node, using the broadcasting path. To take example, the broadcasting matching condition generation function generates the matching condition which uses specification of broadcasting in a transmission address as a condition. Specifically, the broadcasting matching condition generation function generates the matching condition requesting that the top bit (I/G bit; Individual Address/Group Address bit) for transmission of a transmission MAC address be 1. By combining the matching condition as mentioned above and the instruction regarding the broadcasting path, the control information for each communication node can be generated.

One or both of the unicasting path control command generation unit 1007 and the BC path control command generation unit 1009 may cause the communication node located at an entrance from the external node to change an arbitrary field to add to a packet a flag (Unicast/BC identification) flag for identifying whether the packet is to be forwarded using the unicasting path or the broadcasting path. In this case, the one or both of the unicasting path control command generation unit 1007 and the BC path control command generation unit 1009 may cause the communication node located at an exit to the external node to restore the arbitrary field to the original state. As the arbitrary field, an IP ToS (Type of Service) field, a VLAN (Virtual Local Area Network) Priority Field or the like can be employed.

Alternatively, the communication node at the entrance of the external node may degenerate an arbitrary address, and may insert the flag (Unicast/BC identification flag) into the field of this degenerated address. Specifically, a transmission destination MAC address may be degenerated and the degenerated MAC address and the identification flag may be inserted into the field of the transmission destination MAC address. In this case as well, it is preferable that the apparatus at the exit of the external node restore the degenerated address to the original address.

When both of the unicasting path control command generation unit 1007 and the BC path control command generation unit 1009 perform the flag addition, VLAN IDs that are different between unicasting and multicasting may be assigned as the identification flags. Specifically, a unicast VLAN ID may be converted to a dedicated VLAN ID, and an ID in which a destination MAC address and a VLAN ID are degenerated may be assigned, and the destination MAC address may be used as this degenerated ID.

By addition of these flags, the identification flag can be added even to a unicast packet of an unknown destination, and the unicast packet can be forwarded using the broadcasting path.

Each unit (processing means) of the control apparatus 10 illustrated in FIG. 3 can also be implemented by a computer constituting the control apparatus 10, using hardware of the computer and a computer program configured to cause the computer to execute each of the above-mentioned processings.

In the example in FIG. 2, the description has been given, assuming that the data forwarding channels and the control channels are separately provided. These channels may coexist, and a portion of the data forwarding channel, for example, may be used as the control channel. The description has been given, assuming that 16 communication nodes and 8 external nodes are connected in the example in FIG. 2, and one core domain and two sub-domains are provided. Setting of these nodes and domains is just an example, and no limitation is imposed on the number of the nodes and the number of the domains.

Next, operations of this exemplary embodiment will be described in detail with reference to the drawings. First, the operations when a broadcast packet transmitted by the external node connected to the communication node belonging to the core domain is broadcast through the communication node belonging to the sub-domain will be described in detail.

The description will be given about the operations when the external node 300 in FIG. 4 has transmitted the broadcast packet and the broadcast packet then arrives at the external node through the communication node belonging to the sub-domain 21.

Figure 4:
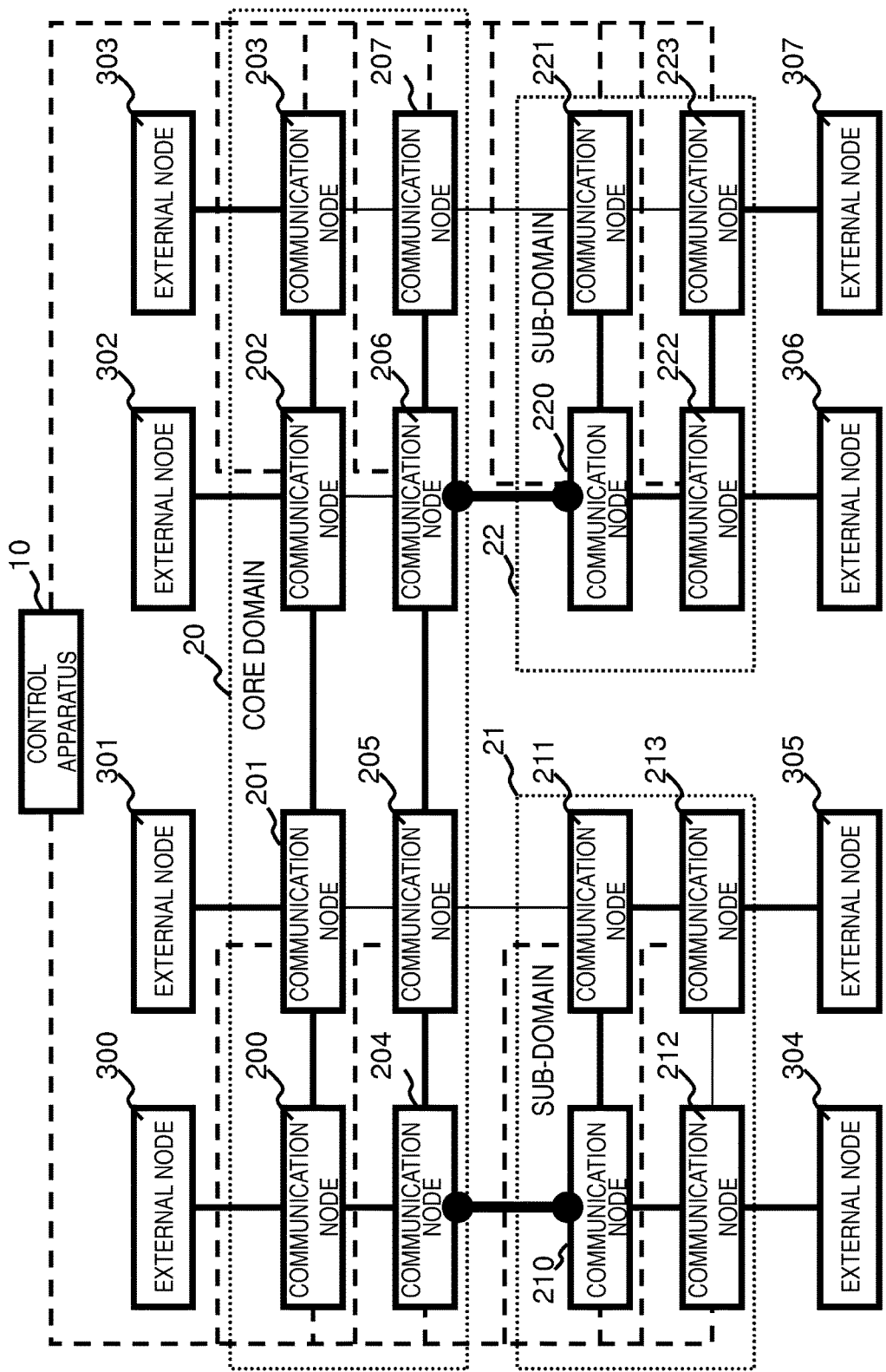
FIG. 4 is a diagram for explaining operations (BC path calculation and selection of a representative port) by the control apparatus in the first exemplary embodiment of the present disclosure.

In the example in FIG. 4, ports connecting the communication node 204 and the communication node 210 as illustrated by a thick solid line are selected as inter-domain GW ports between the core domain 20 and the sub-domain 21.

Similarly, ports connecting the communication node 206 and the communication node 220 are selected as inter-domain GW ports between the core domain 20 and the sub-domain 22.

It is assumed that a broadcast distribution path of the core domain 20 between the communication nodes 200 and the communication node 201 in FIG. 4, between the communication node 200 and the communication node 204 in FIG. 4, between the communication node 201 and the communication node 202 in FIG. 4, between the communication node 202 and the communication node 203 in FIG. 4, between the communication node 204 and the communication node 205 in FIG. 4, between the communication node 205 and the communication node 206 in FIG. 4, and between the communication node 206 and the communication node 207 in FIG. 4 is selected.

It is assumed that, a broadcast distribution path of the sub-domain 21 between the communication node 210 and the communication node 211 in FIG. 4, between the communication node 210 and the communication node 212 in FIG. 4, and between the communication node 211 and the communication node 213 in FIG. 4.

It is assumed that a broadcast distribution path of the sub-domain 22 between the communication node 220 and the communication node 221 in FIG. 4, between the communication node 220 and the communication node 222 in FIG. 4, and between the communication node 222 and the communication node 223 in FIG. 4 is selected.

Figure 5:
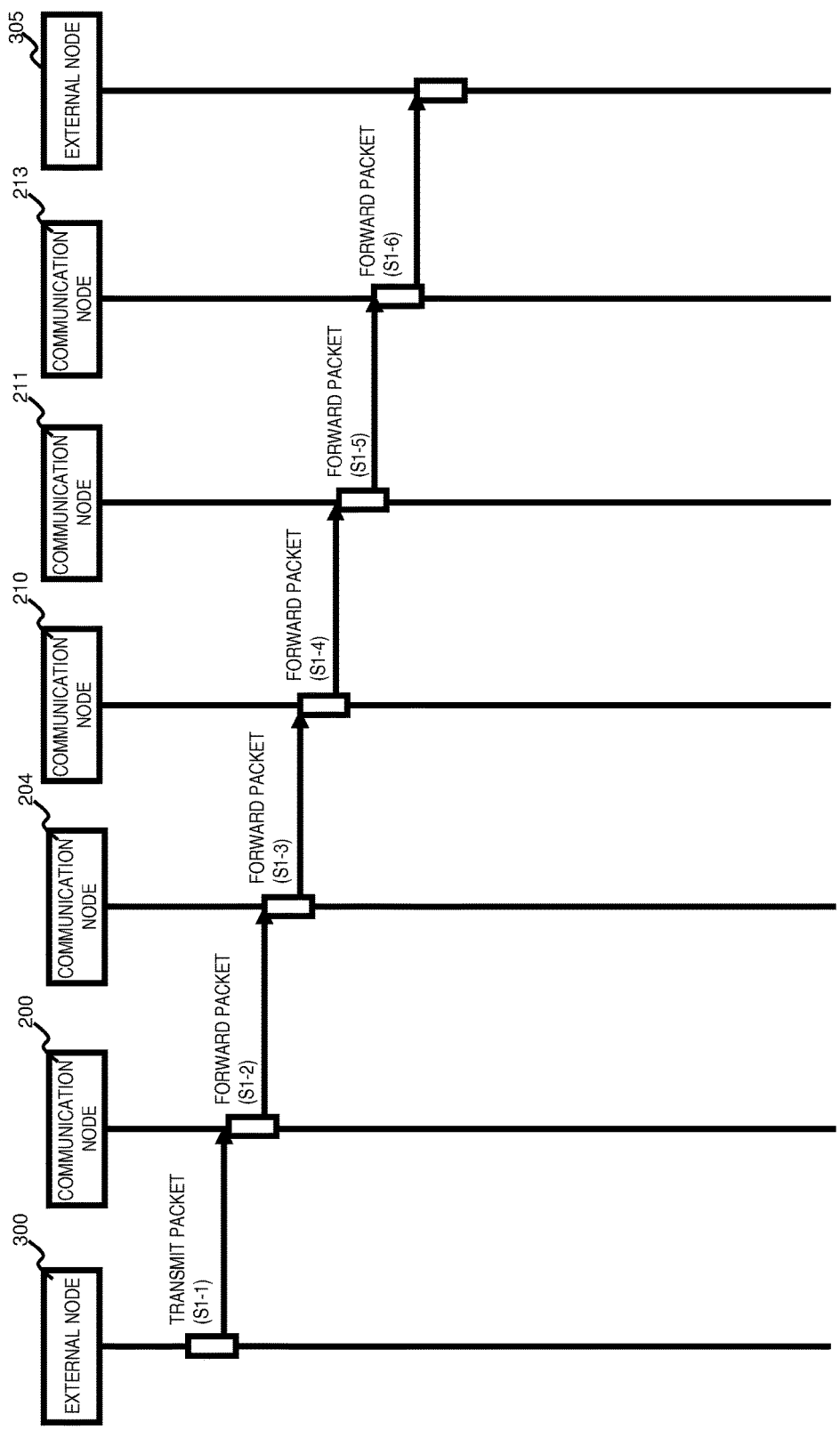
FIG. 5 is a sequence diagram illustrating operations in the communication system in the first exemplary embodiment of the present disclosure.

Using FIG. 5, the description will be given about the operations when the external node 300 transmits the broadcast packet and the broadcast packet is then received at the external node 305, in this state.

The external node 300 transmits the broadcast packet to the communication node 200 (in step S1-1). The communication node 200 forwards the packet to the subsequent communication node 204 on the broadcasting path, based on the control information set by the control apparatus 10 (in step S1-2).

Similarly to the above, the communication node 204 forwards the packet to the subsequent communication node 210 on the broadcasting path, based on the control information set by the control apparatus 10 (in steps S1-3). The communication node 210 forwards the packet to the subsequent communication node 211 on the broadcasting path, based on the control information set by the control apparatus 10 (in step S1-4). The communication node 211 forwards the packet to the subsequent communication node 213 on the broadcasting path, based on the control information set by the control apparatus 10 (in step S1-5). Finally, the communication node 213 forwards the packet to the external node 305, based on the control information set by the control apparatus 10 (in step S1-6). Though omitted in FIG. 5, the broadcast packet from the external node 300 arrives at each of the external nodes 301 to 304, and 306 to 307 as well, in a similar way.

Herein, a description will be directed to operations by the control apparatus 10 when failures have occurred between the communication node 210 and the communication node 211 and between the communication node 212 and the communication node 213 in FIG. 4, and the sub-domain 21 has been divided into a sub-domain 21-1 and a sub-domain 21-2.

Figure 6:
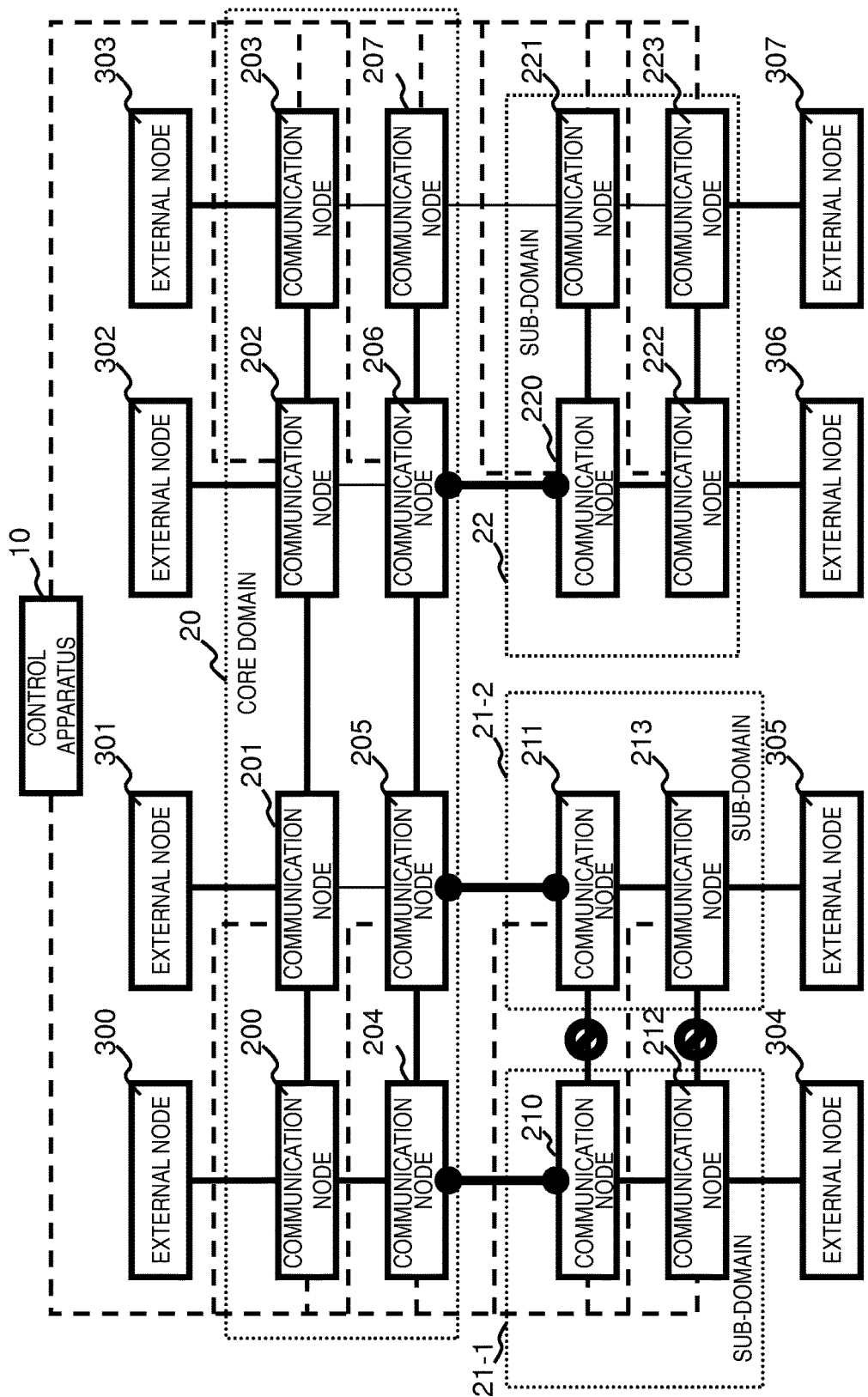
FIG. 6 is a diagram for explaining operations (domain division and reselection of a representative port) by the control apparatus in the first exemplary embodiment of the present disclosure.

FIG. 6 is a diagram showing a state where the control apparatus 10 has selected inter-domain GW ports for the sub-domains 21-1 and 21-2 because the failures have occurred between the communication node 210 and the communication node 211 and between the communication node 212 and the communication node 213. In the example in FIG. 6, in addition to the ports between the communication node 204 and the communication node 210 (inter-domain GW ports between the core domain 20 and the sub-domain 21-1), ports connecting the communication node 205 and the communication node 211 are selected as the inter-domain GW ports between the core domain 20 and the sub-domain 21-2.

Further, due to division of the domain and reselection of the inter-domain GW ports, a broadcast distribution path between the communication node 210 and the communication node 212 is selected for the sub-domain 21-1. Similarly, the broadcast distribution path between the communication node 211 and the communication node 213 is selected for the sub-domain 21-2.

Meanwhile, as is clear from comparison between FIG. 4 and FIG. 6, no change occurs in the broadcast distribution path in the core domain 20 and the sub-domain.

Figure 7:
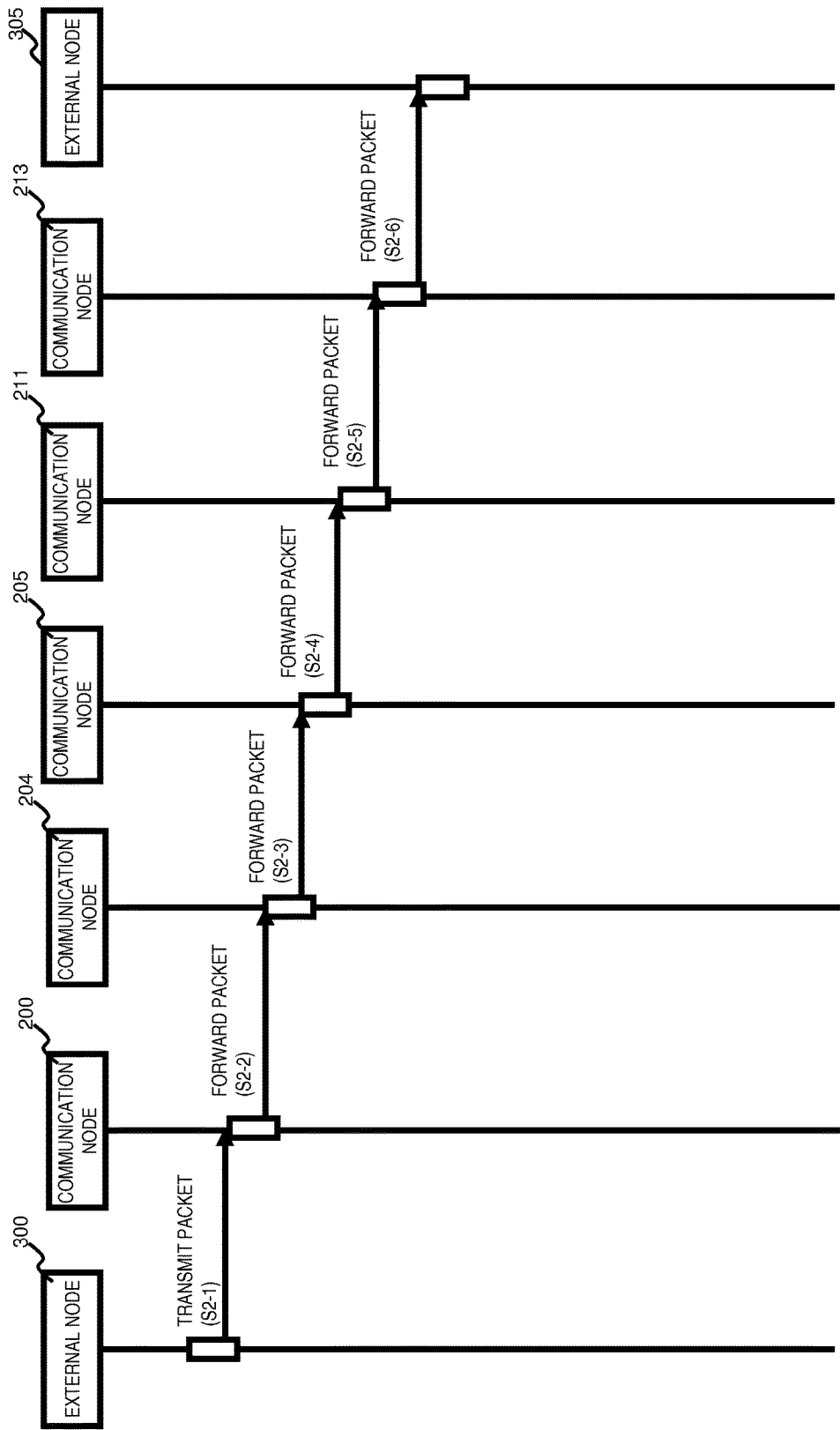
FIG. 7 is a sequence diagram illustrating operations in the communication system in the first exemplary embodiment.

Using FIG. 7, a description will be given about operations when the external node 200 transmits a broadcast packet and the broadcast packet is then received at the external node 305, in this state.

The external node 300 transmits the broadcast packet to the communication node 200 (in step S2-1). The communication node 200 forwards the packet to the subsequent communication node 204 on the broadcasting path, based on the control information set by the control apparatus 10 (in step S2-2).

The communication node 204 forwards the packet to the subsequent communication node 205 on the broadcasting path, based on control information newly set by the control apparatus 10 (in step S2-3). Similarly to the above, the communication node 205 forwards the packet to the subsequent communication node 211 on the broadcasting path, based on the control information set by the control apparatus 10 (in step S2-4). The communication node 211 forwards the packet to the subsequent communication node 213 on the broadcasting-path, based on the control information set by the control apparatus 10 (in step S2-5). Finally, the communication node 213 forwards the packet to the external node 305, based on the control information set by the control apparatus 10 (in step S2-6). Though omitted in FIG. 7, the broadcast packet from the external node 300 arrives at each of the external nodes 301 to 304 and 306 to 307.

As mentioned above, according to this exemplary embodiment, a failure at a location between the communication nodes is prevented from affecting a different location. A load on the control apparatus needed for path calculation and setting of control information can be thereby reduced.

In this exemplary embodiment, the control apparatus 10 controls each communication node such that communication between the domains passes through the inter-domain GW port. Consequently, this exemplary embodiment succeeds in preventing looping of a broadcast packet though the exemplary embodiment has a redundant configuration.

Further, when the communication nodes are decoupled within the sub-domain, the control apparatus 10 in this exemplary embodiment causes a sub-domain to be formed and reselects an inter-domain GW port for each of the communication nodes that have been decoupled. Consequently, as long as the inter-domain GW port can be selected, communication between the domains is possible.

Second Exemplary Embodiment

Next, a description will be given about a second exemplary embodiment where a VLAN ID is rewritten at a communication node in a core domain.

It is assumed in this exemplary embodiment that while each communication node belonging to the core domain includes a function of rewriting a VLAN ID when forwarding a packet, each communication node belonging to each sub-domain does not include the function of rewriting the VLAN ID when the packet is forwarded. Then, in this exemplary embodiment, an example is indicated where the communication node in the core domain having an inter-domain GW port rewrites the VLAN ID of the packet to be forwarded to the sub-domains, thereby making VLAN IDs that are different for respective sub-domains to be usable.

Figure 8:
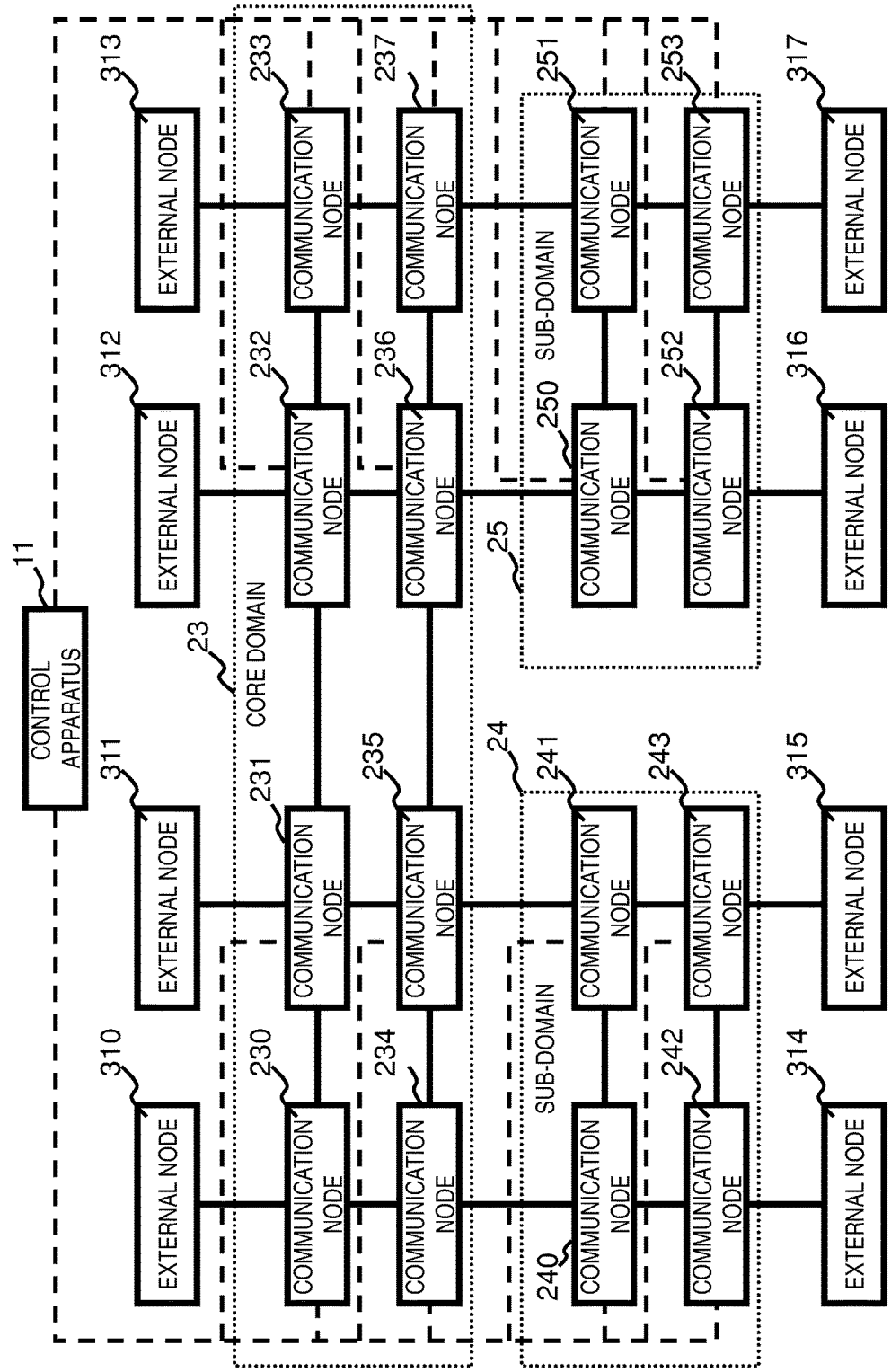
FIG. 8 is a diagram illustrating a configuration of a communication system in a second exemplary embodiment of the present disclosure.

FIG. 8 is a diagram illustrating a configuration of a communication system in this exemplary embodiment. A basic network configuration is the same as that in the first exemplary embodiment. Each of communication nodes 230 to 237 belonging to a core domain 23 includes a function capable of rewriting the VLAN ID of a broadcast packet to forward the packet. It is assumed, on the other hand, that each of communication nodes 240 to 243 belonging to a sub-domain 24 and each of communication nodes 250 to 253 belonging to a sub-domain 25 do not include the function of rewriting the VLAN ID of the broadcast packet. The second exemplary embodiment is the same as the first exemplary embodiment in the other respects including that 8 external nodes 310 to 317 and a control apparatus 11 configured to control the communication nodes are disposed.

Figure 9:
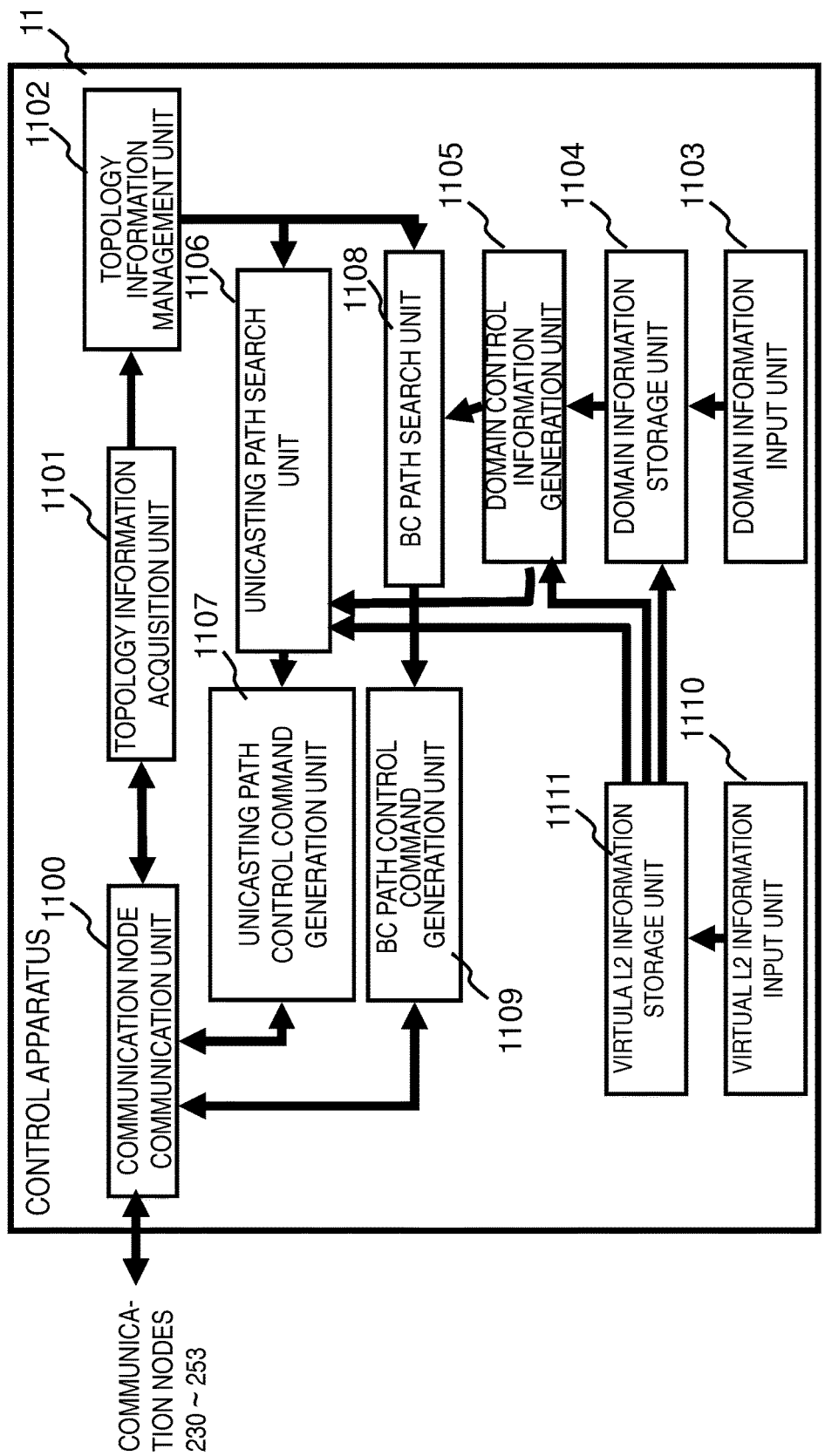
FIG. 9 is a block diagram illustrating a configuration of a control apparatus in the second exemplary embodiment of the present disclosure.

FIG. 9 is a block diagram illustrating a detailed configuration of the control apparatus 11 in the second exemplary embodiment of the present disclosure. Referring to FIG. 9, the control apparatus 11 includes a communication node communication unit 1100, a topology information acquisition unit 1101, a topology information management unit 1102, a domain information input unit 1103, a domain information storage unit 1104, a domain control information generation unit 1105, a unicasting path search unit 1106, a unicasting path control command generation unit 1107, a BC path search unit 1108, a BC path control command generation unit 1109, a virtual L2 information input unit 1110, and a virtual L2 information storage unit 1111. The communication node communication unit 1100 is configured to perform control communication with each communication node. The topology information acquisition unit 1101 is configured to acquire information on a topology among the communication nodes 230 to 237, 240 to 243, and 250 to 253 through the communication node communication unit 1100. The topology information management unit 1102 is configured to store the topology information. The domain information input unit 1103 is configured to receive an input of domain configuration information. The domain information storage unit 1104 is configured to store the domain configuration information received by the domain information input unit 1103. The domain control information generation unit 1105 is configured to select an inter-domain GW port (inter-domain gateway port) as domain control information. The unicasting path search unit 1106 is configured to search a unicasting path. The unicasting path control command generation unit 1107 is configured to generate control information to be set in each of the communication nodes 230 to 237, 240 to 243, and 250 to 253 based on the path searched by the unicasting path search unit 1106 and transmit a control information setting command through the communication node communication unit 1100. The BC path search unit 1008 is configured to search a broadcasting (hereinafter referred to as "BC") path. The BC path control command generation unit 1009 is configured to generate control information to be set in each of the communication nodes 230 to 237, 240 to 243, and 250 to 253 based on the path searched by the BC path search unit 1108 and transmit a control information setting command through the communication node communication unit 1100.

That is, the control apparatus 11 is configured by adding the virtual L2 information input unit 1110 and the virtual L2 information storage unit 1111 to a control apparatus 10 in a first exemplary embodiment. Each of the unicasting path search unit 1106 and the BC path search unit 1108 of the control apparatus 11 in the second exemplary embodiment is configured to refer to virtual L2 information, in addition to the topology information and the domain information, to allow instructing to rewrite a VLAN ID to each communication node. The other configurations are the same as those of the control apparatus 10 in the first exemplary embodiment. Thus, a description will be given below, centering on a difference from the control apparatus 10 in the first exemplary embodiment.

The virtual L2 information input unit 1110 receives an input of a VLAN-ID to each communication node or each domain of a virtual L2 (layer 2) network.

The virtual L2 information storage unit 1111 stores the information received by the virtual L2 information input unit 1110 and provides the information to each of the domain control information generation unit 1105, the unicasting path search unit 1106, and the BC path search unit 1108.

Each of the unicasting path control command generation unit 1107 and the BC path control command generation unit 1109 in this exemplary embodiment instructs one of the communication nodes 230 to 237 belonging to the core domain 23 and having the inter-domain GW port to rewrite the VLAN ID field of a packet. Specifically, each of the unicasting path control command generation unit 1107 and the BC path control command generation unit 1109 refers to the information stored in the virtual L2 information storage unit 1111 and instructs rewriting to the VLAN ID associated with the communication node or the sub-domain opposed through the inter-domain GW port.

Figure 10:
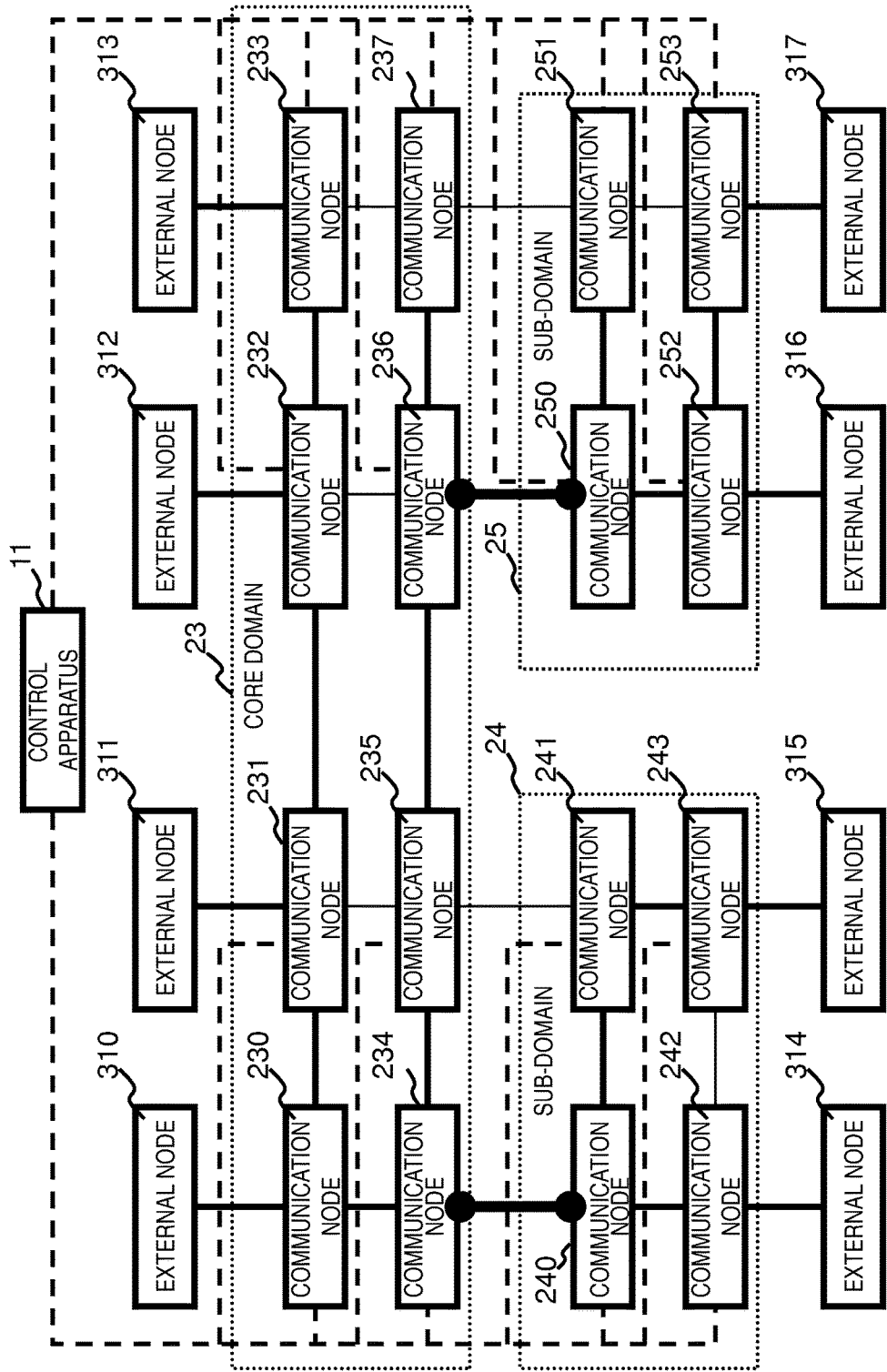
FIG. 10 is a diagram for explaining operations (BC path calculation and selection of a representative port) by the control apparatus in the second exemplary embodiment of the present disclosure.

Next, operations of this exemplary embodiment will be described. It is assumed that in the following description, inter-domain GW ports (refer to thick solid lines) illustrated in FIG. 10 have been set and a broadcasting path illustrated in FIG. 10 has been calculated, as in the first exemplary embodiment.

Figure 11:
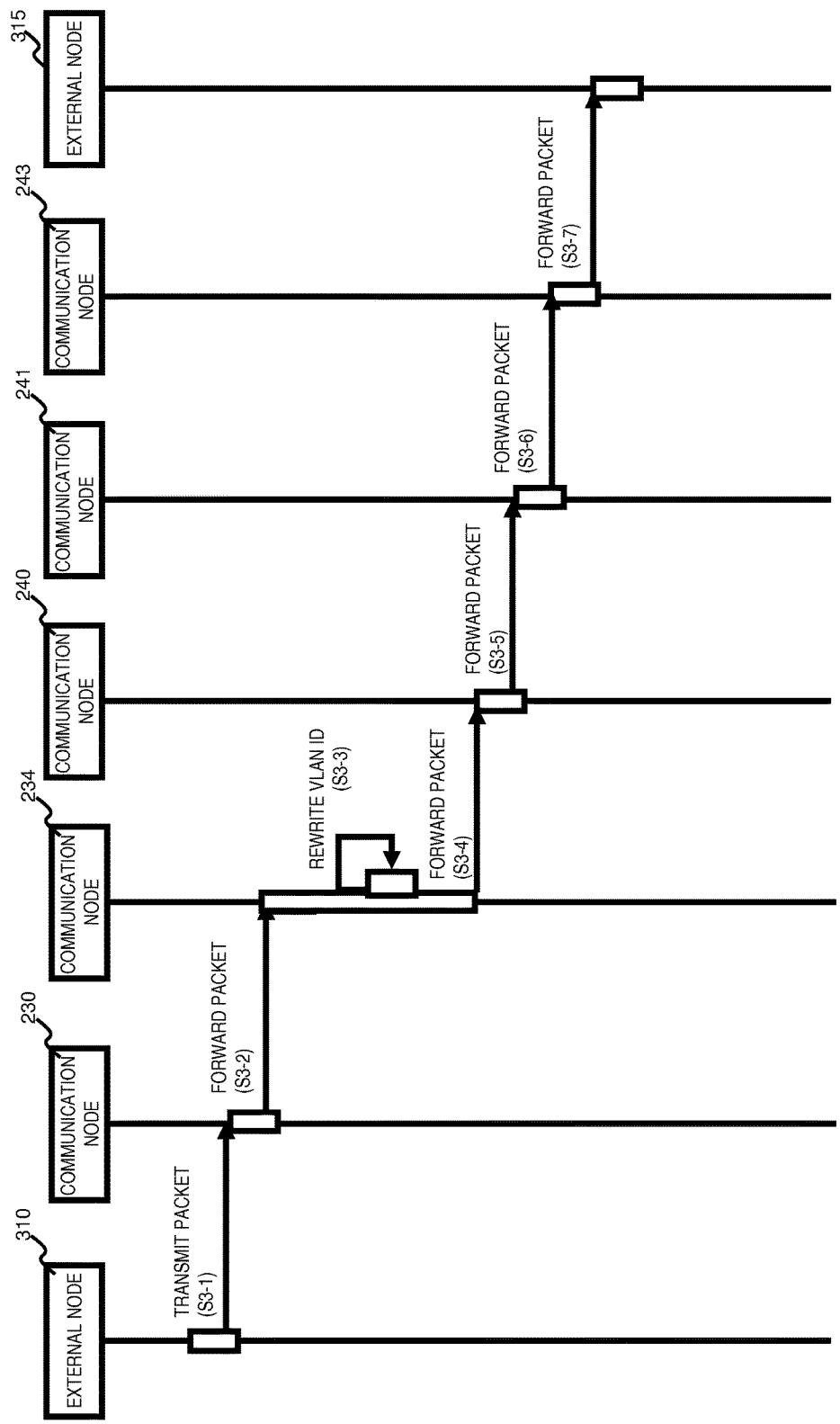
FIG. 11 is a sequence diagram showing operations in the communication system in the second exemplary embodiment of the present disclosure.

Using FIG. 11, the description will be given about the operations when the external node 310 transmits a broadcast packet and the broadcast packet is then received at the external node 315, in this state.

The external node 310 transmits the broadcast packet to the communication node 230 (in step S3-1). The communication node 230 forwards the packet to the subsequent communication node 234 on the broadcasting path, based on the control information set by the control apparatus 11 (in step S3-2).

Herein, the communication node 234 rewrites the VLAN ID of the received broadcast packet to a VLAN ID associated with the sub-domain 24, based on the control information set by the control apparatus 11 (in step S3-3). Further, the communication node 234 forwards the packet to the subsequent communication node 240 on the broadcasting path (in step S3-4).

Similarly from the above, the communication node 240 forwards the packet to the subsequent communication node 241 on the broadcasting path, based on the control information set by the control apparatus 11 (in step S3-5). The communication node 241 forwards the packet to the subsequent communication node 243 on the broadcasting path, based on the control information set by the control apparatus 11 (in step S3-6). Finally, the communication node 243 forwards the packet to the external node 315, based on the control information set by the control apparatus 11 (in step S3-7). Though omitted in FIG. 11, the broadcast packet from the external node 310 arrives at each of the external nodes 311 to 314 and 316 to 317.

As mentioned above, according to this exemplary embodiment, a broadcast packet can be forwarded even if the VLAN IDs that are different for the respective sub-domains are set. Among the communication nodes, there is the communication node in particular including a function of discarding a transmitted packet having a VLAN ID different from the VLAN ID set in the communication node when forwarding the packet. The broadcast packet can be made to arrive even at a location where such a communication node is disposed.

Third Exemplary Embodiment

Next, a description will be given about a third exemplary embodiment in which a core domain is not provided and domains are mutually connected.

Figure 12:
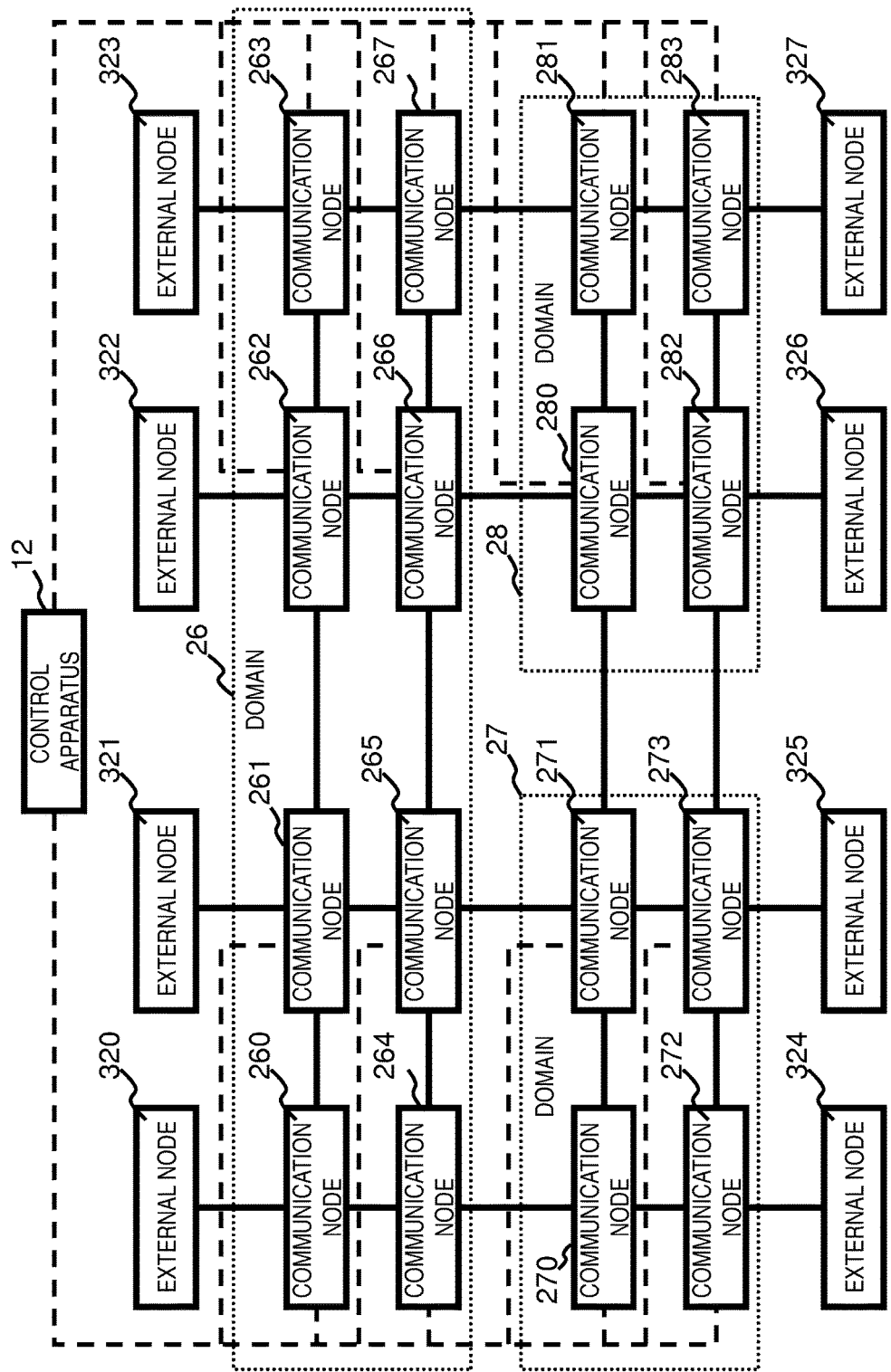
FIG. 12 is a diagram illustrating a configuration of a communication system in a third exemplary embodiment of the present disclosure.

FIG. 12 is a diagram illustrating a configuration of a communication system in this exemplary embodiment. A great difference from a first exemplary embodiment is that domains 26 to 28 are provided in place of a core domain 20, and sub-domains 21 and 22 in the first exemplary embodiment, and the domains 26 to 28 are connected to each other in the form of a ring. Communication nodes 260 to 267 belong to the domain 26, communication nodes 270 to 273 belong to the domain 27, and communication nodes 280 to 283 belong to the domain 28. As for the rest, disposition of 8 external nodes 320 to 327 and disposition of a control apparatus 12 configured to control the communication nodes are similar to those in the first exemplary embodiment.

Figure 13:
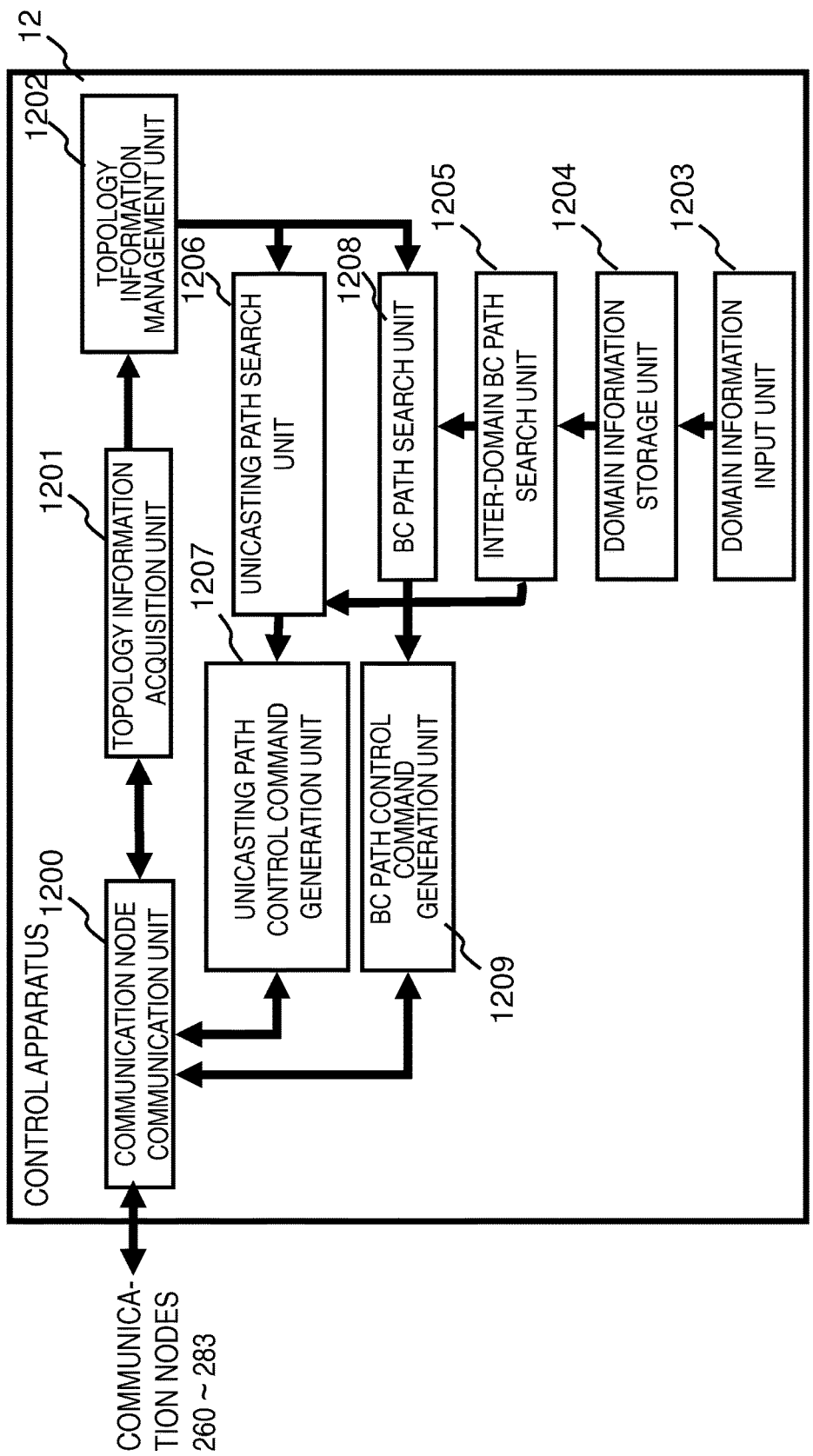
FIG. 13 is a block diagram illustrating a configuration of a control apparatus in the third exemplary embodiment of the present disclosure.

FIG. 13 is a block diagram illustrating a detailed configuration of the control apparatus 12 in the third exemplary embodiment of the present disclosure. Referring to FIG. 13, the control apparatus 12 includes a communication node communication unit 1200, a topology information acquisition unit 1201, a topology information management unit 1202, a domain information input unit 1203, a domain information storage unit 1204, an inter-domain BC path search unit 1205, a unicasting path search unit 1206, a unicasting path control command generation unit 1207, a BC path search unit 1208, and a BC path control command generation unit 1209. The communication node communication unit 1200 is configured to perform control communication with each communication node. The topology information acquisition unit 1201 is configured to acquire information on a topology among the communication nodes 260 to 267, the communication nodes 270 to 273, and the communication nodes 280 to 283 from the communication node communication unit 1200. The topology information management unit 1202 is configured to store the topology information. The domain information input unit 1203 is configured to receive an input of domain configuration information. The domain information storage unit 1204 is configured to store the domain configuration information received by the domain information input unit 1203. The inter-domain BC path search unit 1205 is configured to search an inter-domain broadcast path and notify the inter-domain broadcast path to each of the unicasting path search unit 1206 and the BC path search unit 1208. The unicasting path search unit 1206 is configured to search a unicasting path. The unicasting path control command generation unit 1207 generates control information to be set in each of the communication nodes 260 to 267, the communication nodes 270 to 273, and the communication nodes 280 to 283 based on the path searched by the unicasting path search unit 1206 and transmit a control information setting command through the communication node communication unit 1200. The BC path search unit 1208 is configured to search a broadcasting (hereinafter referred to as "BC") path. The BC path control command generation unit 1209 is configured to generate control information to be set in each of the communication nodes 260 to 267, the communication nodes 270 to 273, and the communication nodes 280 to 283 based on the path searched by the BC path search unit 1208 and transmit a control information setting command through the communication node communication unit 1200. The configuration of the control apparatus 12 is common to the configuration of a control apparatus 10 in the first exemplary embodiment except that a domain control information generation unit 1005 of the control apparatus 10 in the first exemplary embodiment is replaced by the inter-domain BC path search unit (corresponding to an inter-domain path calculation unit) 1205. Thus, a description will be given, centering on a difference from the control apparatus 10 in the first exemplary embodiment.

Figure 14:
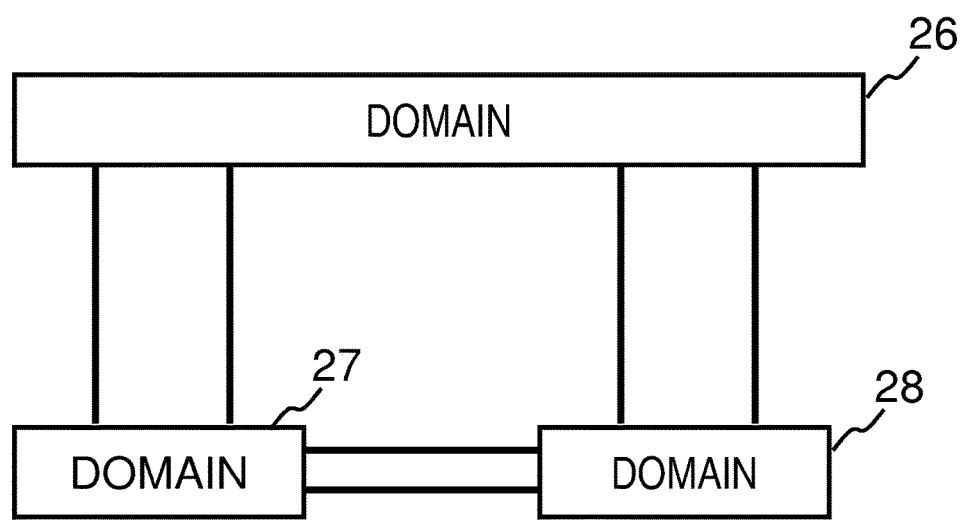
FIG. 14 is a diagram illustrating a connection relationship among domains in the third exemplary embodiment of the present disclosure.

With regard to search of the inter-domain BC path, the inter-domain BC path search unit 1205 performs processing of searching the inter-domain BC path based on the topology information stored in the topology information management unit 1202. More specifically, the inter-domain BC path search unit 1205 regards each domain as a logical communication node as illustrated in FIG. 14, and calculates a spanning tree (spanning tree) path capable of performing distribution from a certain one of the domains to all the other domains connected to at least the external nodes. One or a plurality of the spanning tree paths may be calculated. When the plurality of the spanning tree paths are used, the spanning tree path that is different for each domain connected to the external node may be calculated. As a method of calculating the path, a method using a minimum spanning tree (represented by Prim's algorithm or Kruskal's algorithm) can be pointed out. When this calculation is performed, a certain one of the communication nodes not connected to the external node and being the end of the path may be excluded, and this excluding operation may be repeated to exclude the communication node that is not present between the communication nodes connected to the external nodes.

As a result of the calculation, a port selected for the spanning tree path calculated between the domains is selected as an inter-domain GW port. Transmission of a broadcast packet between the domains through the inter-domain GW port is permitted, and transmission of the broadcast packet through a port connecting the domains other than the inter-domain GW port is not permitted. With this arrangement, even if one of the domains is connected to a plurality of the domains, looping of a broadcast packet to the one of the domains and output of a plurality of the broadcast packets to the ports connecting the domains can be prevented.

Figure 15:
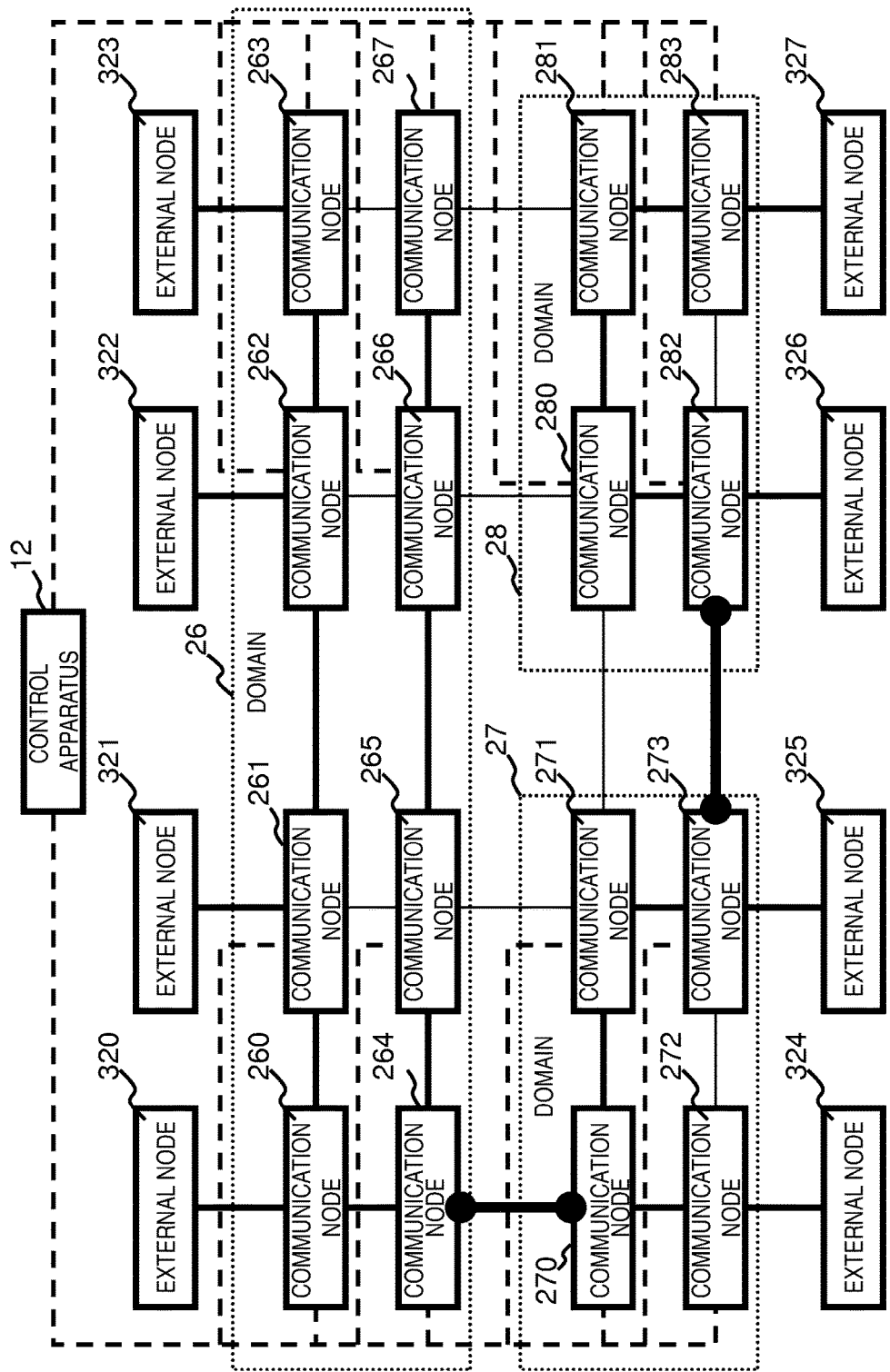
FIG. 15 is a diagram for explaining operations (BC path calculation and selection of a representative port) by the control apparatus in the third exemplary embodiment of the present disclosure.

Next, operations of this exemplary embodiment will be described. In the following description, it is assumed that the inter-domain GW port (refer to each thick solid line) as illustrated in FIG. 15 and the broadcasting path have been calculated, using a calculation result of the inter-domain BC path.

Figure 16:
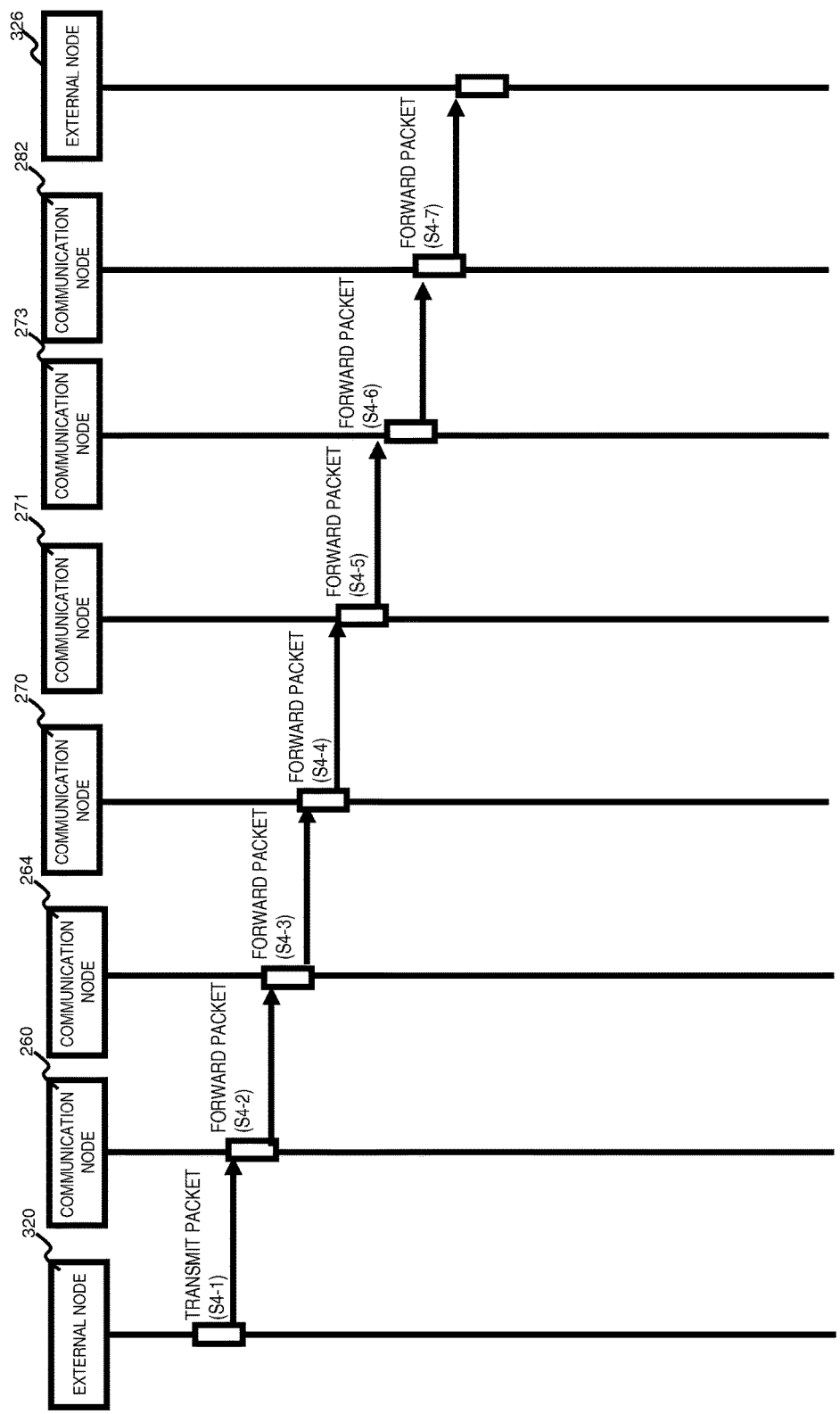
FIG. 16 is a sequence diagram illustrating operations in the communication system in the third exemplary embodiment of the present disclosure.

Using FIG. 16, the description will be given about the operations when the external node 320 connected to the communication node 260 in the domain 26 transmits a broadcast packet and the broadcast packet is then received at the external node 326 connected to the communication node 282 in the domain 28, in this state.

The external node 320 transmits the broadcast packet to the communication node 260 (in step S4-1). The communication node 260 forwards the packet to the subsequent communication node 264 on the broadcasting path, based on the control information set by the control apparatus 12 (in step S4-2).

Similarly from the above, the communication node 264 forwards the packet to the subsequent communication node 270 on the broadcasting path, based on the control information set by the control apparatus 12 (in step S4-3). The communication node 270 forwards the packet to the subsequent communication node 271 on the broadcasting path, based on the control information set by the control apparatus 12 (in step S4-4). The communication node 271 forwards the packet to the subsequent communication node 273 on the broadcasting path, based on the control information set by the control apparatus 12 (in step S4-5). The communication node 273 forwards the packet to the subsequent communication node 282 on the broadcasting path, based on the control information set by the control apparatus 12 (in step S4-6). Finally, the communication node 282 forwards the packet to the external node 326, based on the control information set by the control apparatus 12 (in step S4-7). Though omitted in FIG. 16, the broadcast packet from the external node 320 arrives at each of the external nodes 321 to 325 and 327 as well, in a similar way.

As mentioned above, according to this exemplary embodiment, each path between the domains and each path in each domain are respectively calculated. A broadcast packet can be thereby forwarded. As described in the first exemplary embodiment, a failure that has occurred in a certain one of the domains does not affect the paths in the other domains. When a failure has occurred in the communication node having the port selected as the inter-domain GW port, path recalculation becomes necessary for the domain opposed to the inter-domain GW port, but the failure does not affect the other domains. To take an example, even if a failure has occurred in the inter-domain GW port (in a link on the left side of FIG. 14) between the domain 26 and the domain 27 in FIG. 14, a broadcasting path can be reconfigured by selecting an inter-domain GW port (in a link on the right side of FIG. 14) made to be redundant. In this case, the path in the domain 28 calculated before can be used.

The above description has been directed to each exemplary embodiment of the present invention. The present invention, is not however limited to the above-mentioned exemplary embodiments. Further variation, substitution, and adjustment can be added without departing from the basic technical concept of the present invention. The network configuration and the configurations of the elements illustrated in the respective drawings are an example for helping understanding of the present invention, and are not limited to the configurations illustrated in these drawings.

Finally, preferred modes of the present invention will be summarized.

First Mode (See the control apparatus according to the first aspect described above).

Second Mode

The control apparatus according to the first aspect, wherein the domain comprises low-order domains formed by switches disposed at two physically separated locations and a high-order domain connecting the low-order domains.

Third Mode

The control apparatus according to the first mode or the second mode, further comprising:
a domain information input unit configured to receive an input of configuration information of the domain; and
a domain information storage unit configured to store the configuration information of the domain of which the input has been received.

Fourth Mode

The control apparatus according to any one of the first to third modes, wherein the control apparatus instructs one of the communication nodes including the representative port to rewrite a VLAN ID.

Fifth Mode

The control apparatus according to any one of the first to fourth modes, wherein
when a failure has occurred in the forwarding path for the broadcast packet for each of the domains, the control apparatus executes the selection of a representative port and executes recalculation of a forwarding path for the broadcast packet in the domain where the representative port has been changed.

Sixth Mode

The control apparatus according to any one of the first to fifth modes, comprising:
an inter-domain path calculation unit configured to calculate a forwarding path for the broadcast packet for each domain and select an inter-domain port on the forwarding path for the broadcast packet for each domain as the representative port.

Seventh Mode (See the communication system according to the second aspect described above).

Eighth Mode (See the communication node control method according to the third aspect described above).

Ninth Mode (See the program according to the fourth aspect described above).

The seventh to ninth modes can be developed into the second to sixth mode, like the first mode.

Each disclosure of the above-listed Patent Literature and the above-listed Non-Patent Literatures is incorporated herein by reference. Modification and adjustment of each exemplary embodiment and each example are possible within the scope of the overall disclosure (including the claims) of the present invention and based on the basic technical concept of the present invention. Various combinations and selections of various disclosed elements (including each element of each claim, each element of each exemplary embodiment and each example, each element of each drawing, and the like) are possible within the scope of the overall disclosure of the present invention. That is, the present invention naturally includes various variations and modifications that could be made by those skilled in the art according to the overall disclosure including the claims and the technical concept. With respect to a numerical value range described herein in particular, an arbitrary numerical value and a small range included in the numerical value range should be construed to be specifically described even unless otherwise explicitly described.

REFERENCE SIGNS LIST 10, 10A, 11, 12 control apparatus
20, 23 core domain
21, 21-1, 21-2, 22, 24, 25 sub-domain 26-28, 30, 31 domain
41, 42 control channel
200-223, 230-253, 260-283, SW communication node
300-327 external node
1000, 1100, 1200 communication node communication unit
1000A representative port selection unit
1001, 1101, 1201 topology information acquisition unit
1001A broadcast path calculation unit
1002, 1102, 1202 topology information management unit
1002A control information generation unit
1003, 1103, 1203 domain information input unit
1003A control information setting unit
1004, 1104, 1204 domain information storage unit
1005, 1105 domain control information generation unit
1006, 1106, 1206 unicasting path search unit
1007, 1107, 1207 unicating path control command generation unit
1008, 1108, 1208 BC path search unit
1009, 1109, 1209 BC path control command generation unit
1110 virtual L2 information input unit
1111 virtual L2 information storage unit
1205 inter-domain BC path search unit

What is claimed is:

1. A control apparatus comprising:
a memory configured to store program instructions; and
a processor configured to execute the program instructions to provide:
a representative port selection unit configured to select, for each of a plurality of domains formed by a plurality of communication nodes disposed on a network to be controlled, a representative port of at least one of the plurality of communication nodes configured to transfer a broadcast packet with an adjacent one of the domains, the plurality of domains are logically formed for respective locations;
a broadcast path calculation unit configured to calculate a forwarding path for the broadcast packet that passes through the representative port, for each of the domains;
a control information generation unit configured to generate, for each communication node on the forwarding path, control information for causing the broadcast packet to be forwarded along the forwarding path; and
a control information setting unit configured to set the generated control information in each communication node on the forwarding path,
wherein the representative ports connecting the communication nodes are selected as inter-domain gateway ports between a higher order core domain and a lower order sub-domain by the representative port selection unit.

2. The control apparatus according to claim 1, wherein the domain comprises low-order domains formed by switches disposed at two physically separated locations and a high-order domain connecting the low-order domains.

3. The control apparatus according to claim 2, wherein the processor is further configured to execute the program instructions to provide:
a domain information input configured to receive an input of configuration information of the domain; and
a domain information storage configured to store the configuration information of the domain of which the input has been received.

4. The control apparatus according to claim 2, wherein the control apparatus instructs one of the communication nodes including the representative port to rewrite a VLAN ID (Virtual Local Area Network Identifier).

5. The control apparatus according to claim 2, wherein when a failure has occurred in the forwarding path for the broadcast packet for each of the domains, the control apparatus executes the selection of a representative port again and executes recalculation of a forwarding path for the broadcast packet in the domain where the representative port has been changed.

6. The control apparatus according to claim 2, wherein the processor is further configured to execute the program instructions to provide:
an inter-domain path calculation unit in place of the representative port selection unit, the inter-domain path calculation unit being configured to calculate a forwarding path for the broadcast packet for each domain and select an inter-domain port on the forwarding path for the broadcast packet for each domain as the representative port.

7. The control apparatus according to claim 1, wherein the processor is further configured to execute the program instructions to provide:
a domain information input configured to receive an input of configuration information of the domain; and
a domain information storage configured to store the configuration information of the domain of which the input has been received.

8. The control apparatus according to claim 7, wherein the control apparatus instructs one of the communication nodes including the representative port to rewrite a VLAN ID (Virtual Local Area Network Identifier).

9. The control apparatus according to claim 7, wherein when a failure has occurred in the forwarding path for the broadcast packet for each of the domains, the control apparatus executes the selection of a representative port again and executes recalculation of a forwarding path for the broadcast packet in the domain where the representative port has been changed.

10. The control apparatus according to claim 7, wherein the processor is further configured to execute the program instructions to provide:
an inter-domain path calculation unit in place of the representative port selection unit, the inter-domain path calculation unit being configured to calculate a forwarding path for the broadcast packet for each domain and select an inter-domain port on the forwarding path for the broadcast packet for each domain as the representative port.

11. The control apparatus according to claim 1, wherein the control apparatus instructs one of the communication nodes including the representative port to rewrite a VLAN ID (Virtual Local Area Network Identifier).

12. The control apparatus according to claim 11, wherein when a failure has occurred in the forwarding path for the broadcast packet for each of the domains, the control apparatus executes the selection of a representative port again and executes recalculation of a forwarding path for the broadcast packet in the domain where the representative port has been changed.

13. The control apparatus according to claim 11, wherein the processor is further configured to execute the program instructions to provide:
an inter-domain path calculation unit in place of the representative port selection unit, the inter-domain path calculation unit being configured to calculate a forwarding path for the broadcast packet for each domain and select an inter-domain port on the forwarding path for the broadcast packet for each domain as the representative port.

14. The control apparatus according to claim 1, wherein when a failure has occurred in the forwarding path for the broadcast packet for each of the domains, the control apparatus executes the selection of a representative port again and executes recalculation of a forwarding path for the broadcast packet in the domain where the representative port has been changed.

15. The control apparatus according to claim 14, wherein the processor is further configured to execute the program instructions to provide:
an inter-domain path calculation unit in place of the representative port selection unit, the inter-domain path calculation unit being configured to calculate a forwarding path for the broadcast packet for each domain and select an inter-domain port on the forwarding path for the broadcast packet for each domain as the representative port.

16. The control apparatus according to claim 1, wherein the processor is further configured to execute the program instructions to provide:
an inter-domain path calculation unit in place of the representative port selection unit, the inter-domain path calculation unit being configured to calculate a forwarding path for the broadcast packet for each domain and select an inter-domain port on the forwarding path for the broadcast packet for each domain as the representative port.

17. The control apparatus according to claim 1, wherein the representative port comprises a port for transferring the broadcast packet with an adjacent one of the domains, the representative port is the port for each of the plurality of communication nodes between the domains, and
wherein the plurality of communication nodes are formed at a plurality of locations and belong to the plurality of domains that are logically formed for the respective locations from among the plurality of locations.

18. A communication system comprising:
a control apparatus including:
a memory storing program instructions; and
a processor configured to execute program instructions to provide:
a representative port selection unit configured to select, for each of a plurality of domains formed by a plurality of communication nodes disposed on a network to be controlled, a representative port configured to transfer a broadcast packet with an adjacent one of the domains, the plurality of domains are logically formed for respective locations;
a broadcast path calculation unit configured to calculate a forwarding path for the broadcast packet that passes through the representative port, for each of the domains;
a control information generation unit configured to generate, for each communication node on the forwarding path, control information for causing the broadcast packet to be forwarded along the forwarding path; and
a control information setting unit configured to set the generated control information in each communication node on the forwarding path; and
the communication nodes each configured to process the packet according to the control information set by the control apparatus,
wherein the representative ports connecting the communication nodes are selected as inter-domain gateway ports between a higher order core domain and a lower order sub-domain by the representative port selection unit.

19. A communication node control method by a control apparatus, the communication node control method comprising:
selecting, for each of a plurality of domains formed by a plurality of communication nodes disposed on a network to be controlled, a representative port configured to transfer a broadcast packet with an adjacent one of the domains, the plurality of domains are logically formed for respective locations;
calculating a forwarding path for the broadcast packet that passes through the representative port, for each of the domains;
generating, for each communication node on the forwarding path, control information for causing the broadcast packet to be forwarded along the forwarding path; and
setting the generated control information in each communication node on the forwarding path,
wherein the representative ports connector the communication nodes are selected as inter-domain gateway ports between a higher order core domain and a lower Order sub-domain by the selecting.

20. A non-transitory computer-readable recording medium storing thereon a program configured to cause a computer to execute processings of:
selecting, for each of a plurality of domains formed by a plurality of communication nodes disposed on a network to be controlled, a representative port configured to transfer a broadcast packet with an adjacent one of the domains, the plurality of domains are logically formed for respective locations;
calculating a forwarding path for the broadcast packet that passes through the representative port, for each of the domains;
generating, for each communication node on the forwarding path, control information for causing the broadcast packet to be forwarded along the forwarding path; and
setting the generated control information in each communication node on the forwarding path,
wherein the representative ports connecting the communication nodes are selected as inter-domain gateway ports between a higher order core domain and a lower order sub-domain by the selecting.

21. A control apparatus comprising:
a memory configured to store program instructions; and
a processor configured to execute the program instructions to provide:
a representative port selection unit configured to select, for each of a plurality of domains formed b a plurality of communication nodes disposed on a network to be controlled, a representative port of at least one of the plurality of communication nodes configured to transfer a broadcast packet with an adjacent one of the domains, the plurality of domains are logically formed for respective locations;
a broadcast path calculation unit configured to calculate a forwarding path for the broadcast packet that passes through the representative port, for each of the domains:
a control information generation unit configured to generate, for each communication node on the forwarding path, control information for causing the broadcast packet to be forwarded along the forwarding path; and a control information setting unit configured to set the generated control information in each communication node on the forwarding path, wherein the domain control information generation unit performs processing of selecting an inter-domain gateway port that serves as the representative port between the domains including higher order core domains and a lower order sub-domain, based on the domain information stored in a domain information storage and the topology information stored in a topology table, and wherein the control apparatus controls the representative selection unit and the plurality of domains.

* * * * *